(12) United States Patent
Pennock et al.

(10) Patent No.: US 7,373,210 B2
(45) Date of Patent: May 13, 2008

(54) EFFECTS AND RECORDING SYSTEM

(75) Inventors: James D. Pennock, Salt Lake City, UT (US); Peter Chaikin, Santa Monica, CA (US); Josh Kapp, Orem, UT (US); John Hanson, West Jordan, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 723 days.

(21) Appl. No.: 10/341,684

(22) Filed: Jan. 14, 2003

(65) Prior Publication Data

US 2004/0136549 A1 Jul. 15, 2004

(51) Int. Cl.
| | |
|---|---|
| *G06F 17/00* | (2006.01) |
| *H03G 3/00* | (2006.01) |
| *G10H 1/00* | (2006.01) |
| *G10H 7/00* | (2006.01) |
| *H04B 1/00* | (2006.01) |
| *G03B 15/00* | (2006.01) |
| *G03B 15/02* | (2006.01) |

(52) U.S. Cl. ................ 700/94; 381/61; 381/118; 381/119; 396/1; 396/4; 84/612; 84/659

(58) Field of Classification Search ............ 381/61, 381/118, 119; 700/94; 369/1, 4; 360/18; 84/612, 659

See application file for complete search history.

(56) References Cited

U.S. PATENT DOCUMENTS

| | | | | |
|---|---|---|---|---|
| 5,179,240 A | * | 1/1993 | Mizuno et al. | 84/613 |
| 5,569,038 A | * | 10/1996 | Tubman et al. | 434/308 |
| 5,792,971 A | * | 8/1998 | Timis et al. | 84/609 |

OTHER PUBLICATIONS

Yamaha Corp.: AW4416 Professional Audio Workstation, Operation Guide; Yamaha AW4416 Homepage Online!, Oct. 5, 2002, XP002277014 Official AW4416 Web-site retrieved from the internet: URL:http://web.archive.org/web/20021005154108/http://www.aw4416.com/awos/manual_e/operation_E.pdf retrieved on Apr. 1, 2004, pp. 1-212.

(Continued)

*Primary Examiner*—Xu Mei
*Assistant Examiner*—Douglas Suthers
(74) *Attorney, Agent, or Firm*—Brinks Hofer Gilson & Lione

(57) ABSTRACT

An effects and recording system is provided which is capable of recording at least one of a received audio signal and a processed audio signal generated by the application of musical effects to the received audio signal. The audio signal may be captured from any device capable of producing an audio signal. The effects and recording system may provide various recording capabilities including auto track selection and arming, automatic signal routing, delayed recording initialization, automatic level setting and panning settings, editing capabilities, and the merging of recorded tracks. Additionally, the effects and recording system may provide various monitoring capabilities, including automatic level, panning, and/or effects or other filtering of signals recorded or monitored via the system, as well as an enhanced mix-down feature, and music mix-down type.

102 Claims, 9 Drawing Sheets

OTHER PUBLICATIONS

Roland, "VS-1680 24-Bit Digital Studio Workstation, TurboStart", Roland US Support Hompage, Online, 1998 XP002277015, Roland USA website, retrieved from the internet: http://.web.archive.org/web/20010501034814/www.rolandus.com/support/docs/vs1680.pdf>, Apr. 1, 2004, 1 pg.

Roland DE: "Roland 2002 Produkte +Precise", Roland Catalog, Mar. 2002 pp. 1,-3, 18-24, XP002277017.

"Handbuch für Musiker 2002", Musik Produktiv Catalog, 2002, XP002277018pp. 4-5, 413-419, 459-460, 616-619.

European Search Report EP 04 00 0342, dated Apr. 22, 2004.

* cited by examiner

| Music Mix-Down | Voice/Instrument Information | Balance | Level | Filtering/effects |
|---|---|---|---|---|
| Jazz | Trumpet<br>Saxophone<br>Piano<br><br>Lead Vocal<br><br>Back-Up Vocal<br>. <br>. <br>. | Mono, stage-left<br>Mono, stage-right<br>Stereo, stage-center<br><br>Mono, stage-center<br><br>Stereo, stage-right | .75<br>1.25<br>1.0<br><br>1.25<br><br>.75 | Small-club reverb<br>Small-club reverb<br>Small-club reverb<br>Treble Enhance<br>Compression<br>Plate reverb<br>Chorus<br>reverb |
| Rap | Guitar<br>Drums<br>Lead Vocal<br>. <br>. <br>. | Mono, stage-right<br>Stereo, stage-center<br>Mono, stage-center | 1.0<br>1.5<br>1.25 | None<br>Bass Enhance<br>Bass Enhance<br>Slap-back echo |

Columns labeled (left to right): 1005, 1010, 1015, 1020, 1030. Row labels: 1007 (Jazz), 1035 (Rap).

Figure 10

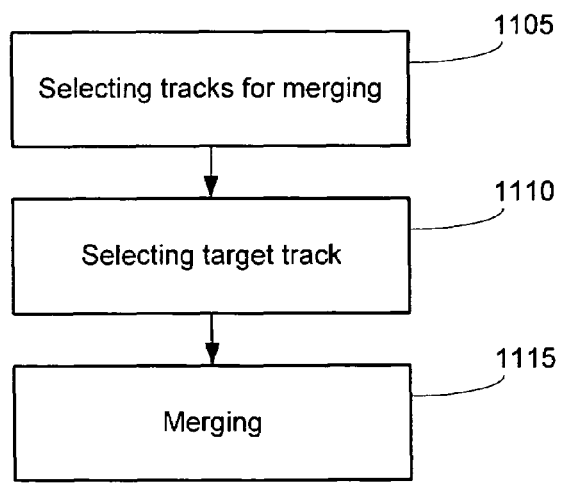

Figure 11

EFFECTS AND RECORDING SYSTEM

BACKGROUND OF THE INVENTION

1. Technical Field

The invention generally relates to audio processing and recording, and, more particularly, to a system capable of applying musical effects to, and recording of, an audio signal.

2. Related Art

Multi-effect units are units capable of receiving an audio signal, such as a signal produced by an instrument connected to the unit, like an electric guitar, and applying musical effects to the signal. The musical effects may include, for example, delay, reverb, and chorus/modulation effects. A loudspeaker is usually provided, either integrated with or connected to the unit, allowing monitoring of the signal with effects applied. The multi-effect units are typically floor-based units to allow for control during practice and live performance, with control primarily being done with the musician's feet.

The multi-effects unit includes a multi-effects processor that allows for limited manipulation and processing of the sound and the application of musical effects and may include amplifier and speaker cabinet modeling capabilities. The multi-effects also unit includes a footswitch, providing control over individual parameters of the signal processing to modify the sound while performing. When the musician desires to record his performance, a recording device with a microphone may be utilized to capture the performance. Alternatively, the multi-effects unit may be connected directly to a recording device, for example an 8-track recording device that is usually either a tabletop or rack mounted device intended for use in a studio installation.

Because of the many settings and connections required for the recording devices, the recording devices are typically designed for a recording engineer to control during the musician's performance. Various technical aspects must be considered to set up and control the recording of the performance, such as input leveling, input mixing, signal routing, signal to noise performance, dynamic range control, track selection and output mixing.

Because of the many considerations in setting-up and recording the performance, it is often difficult, if not impossible for the musician to handle the technical aspects of the recording to capture the performance. Interruption of the creative process of making music to tend to the technical considerations of recording tends to stifle the creativity of the musician attempting to act as both a musician and recording engineer. Accordingly, a musician must typically go to a recording studio and set up a session that is dedicated to recording the performance in order to capture a musical piece or idea. However, many creative ideas are often found during practice or during live performance outside of the studio. Because of the lack of proper recording equipment and control, such creative ideas are usually lost.

Further, the setting up and capturing of the performance with a recording device tends to be a very complicated process, and any errors could result in audio signals being lost and not recorded. Where patch cables are improperly routed between the multi-effects unit and the recorder, the audio signal desired to be recorded may be lost. Further, inadvertent selection of a track to be recorded to on the recorder may result in the loss of an already recorded signal, if the selected track already contained a recorded audio signal. In addition, the output signal from the multi-effects unit may be different than the input requirements of the recording device. If the input level for the recorder is not properly set in this case, the audio signal recorded to the recorder may be distorted or otherwise undesirable, even though the sound being monitored appears acceptable. Additionally, correct panning or balance must be set for the audio track(s) being monitored, which may depend on the particular input audio signal (i.e., guitar, any other instrument, voice). Further, where multiple tracks are recorded in a session, the delay to reroute the audio signals to a new, available audio track, as well as any necessary level and other mixing adjustments, may interfere with the musician's creativity.

SUMMARY

An effects and recording system is disclosed that is capable of recording at least one of a received audio signal and a processed audio signal generated by the application of musical effects to the received audio signal. The audio signal may be captured from any instrument, microphone, or any other device capable of producing an audio signal, such as an optical disc player or magnetic tape player. A user interface may be provided, including switches, knobs, foot pedals and dials, which may be used in accessing and configuring various features, operations and capabilities of the system. The switches may include one or more foot switches, as well, that may be used to provide a hands-free interface with the effects and recording system.

The effects and recording system provides various recording capabilities, including, for example, automatic track selection and arming by determining a next track(s) available for recording, and arming the appropriate available track(s) for recording. Further, the audio signal to be recorded may be automatically routed to the next available audio track for recording. Other features may also be provided by the effects and recording system.

A delayed recording feature may be provided, so that when a request is made to initiate recording, a predetermined or user-configured delay is provided before the recording is initiated. The delay feature may be utilized for providing a pre-roll feature, by including an audio and/or visual signal indicating a tempo for the recording. Additionally, an always recording feature may be provided, where the effects and recording unit begins recording after a predetermined time, and upon termination of the recording, the recorded audio track may be cropped to keep the portion(s) desired. Further, level and/or other filtering may automatically be provided for audio signals to be recorded. Such level and/or filtering capabilities may include application of specified musical effects, or providing a list of musical effects and other filtering features, responsive to information regarding an instrument being recorded. In addition, editing capabilities, including deletion of a recorded audio track, or altering portions of recorded audio tracks, may be provided. Further, one or more recorded audio tracks may be merged with one another, or merged with a new audio signal received at the effects and recording system.

Additionally, the effects and recording system may provide various monitoring capabilities during recording, or independent of recording. Such monitoring capabilities may include automatic level, balance filtering and/or effects application of signals recorded or monitored via the system. An enhanced mix-down feature may be provided, where a predetermined or user configurable output mix is provided automatically responsive to instrument, voice and/or music mix-down information provided for one or more recorded audio tracks.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a tabular representation of portions of a data base which may be utilized for providing the enhanced-mixdown in the effects and recording system of FIG. 2.

FIG. 11 is a flow chart illustrating merging audio tracks in the effects and recording system of FIG. 2.

DETAILED DESCRIPTION OF THE PREFERRED EMBODIMENTS

An effects and recording system is provided, which is capable of recording at least one of a received audio signal and a processed audio signal generated by the application of musical effects to the received audio signal, where the effects and recording system has performance-mode capabilities. Such performance-mode capabilities may include automation of any portion of the recording process, and need not include automation of the whole recording process, as is further described below. The effects and recording system may allow for the automation of many of the technical aspects of recording an audio signal, freeing-up the musician to focus on the creative process of making music. Further, the automation of various technical aspects may substantially reduce the possibilities of lost audio signals resulting from improper patch cable configurations or recording over already recorded audio tracks due to improper track selection. The effects and recording system also provides various recording and editing features, as well as monitoring capabilities as discussed below.

Figure 1:
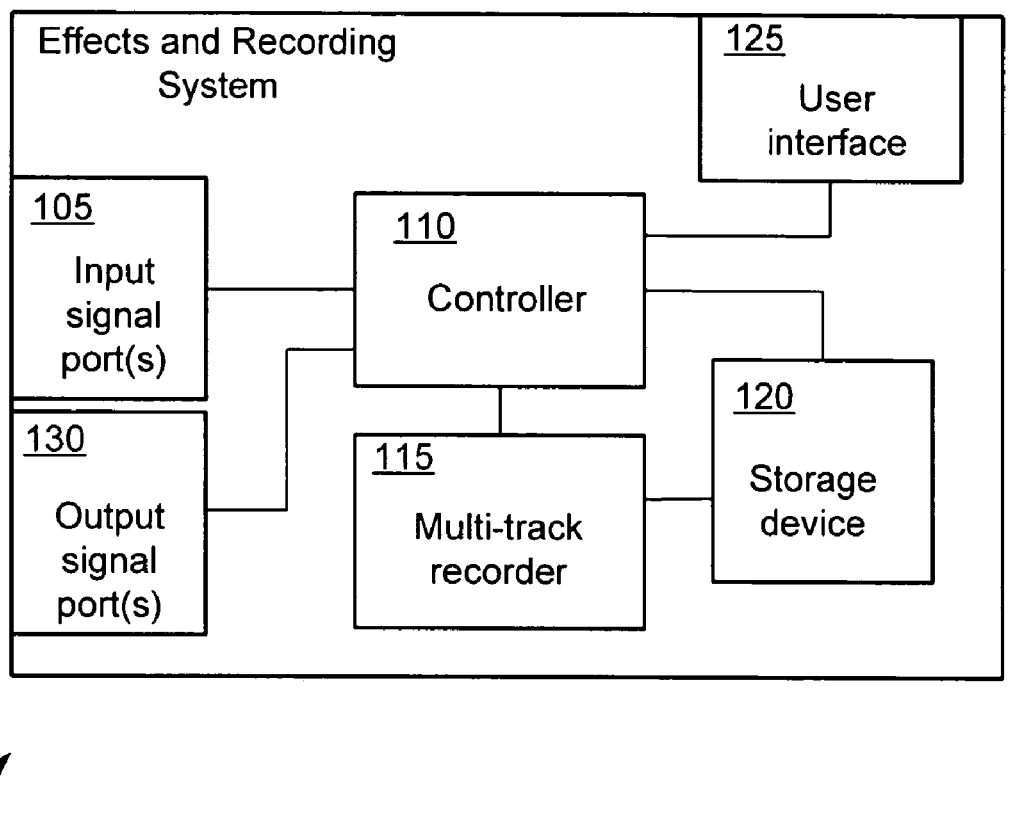
FIG. 1 is a functional block diagram of an example effects and recording system.

FIG. 1 illustrates a functional block diagram of an effects and recording system 100. One or more input signal ports 105 are coupled with a controller 110. The controller 110 is further coupled with a multi-track recorder 115, a storage device 120, a user interface 125, and one or more output signal ports 130. The multi-track recorder 115 further may be coupled to the storage device 120.

The controller 110 is capable of controlling the effects and recording system 100, including controlling any signal routing between the various components of the system 100. The controller 110 is further capable of providing various digital signal processing (DSP) algorithms on audio signals received at the input signal ports 105 to apply, for example, musical effects to the received audio signal. The musical effects may include, but are not limited to, selecting or adjusting speaker cabinet and/or amplifier models, pitch shifting, detuning, stomp box modeling, equalizer functionality, noise gate functionality, delay, reverb, chorus/modulation effects, dynamic-range compression, peak limiting, dynamic-range expansion, "slap-back" delay or any other filtration or processing for altering the received audio signal to generate the processed audio signal. Additionally, the controller 110 is capable of providing DSP algorithms to a recorded audio track (i.e., an audio signal that has been recorded at the multi-track recorder 115) as described below.

The controller 110 additionally is capable of providing one or more audio signals (i.e., received or processed audio signals, or recorded audio tracks) at one or more of the output signal ports 130, for example, to allow monitoring of the audio signals at the effects and recording system 100. When providing monitoring of the audio signals at one or more of the output signal ports 130, the controller may provide automatic signal leveling and balance adjustment (i.e., left and right panning). The controller 10 may additionally apply musical effects, or filtering such as frequency-band responsive filtering to enhance the bass of an audio signal and the like, to audio signals being monitored, as discussed below. The functions of the controller 110 may be responsive to inputs received via the user interface 125, the input signal ports 105, and/or to predetermined settings of the effects and recording system 100 such as default programmed code of the system 100 or user-set configurations, as described below.

The multi-track recorder 115 is capable of recording at least one of the received audio signal and the processed audio signal on one or more tracks of the multi-track recorder as a recorded audio track. The multi-track recorder may store any of the recorded tracks at the storage device 120, for recovery, monitoring (i.e., playback), processing, and/or any other use at a subsequent time. Further, the multi-track recorder 115 may allow for various features and functionalities. For example, the multi-track recorder may automatically arm one or more next available tracks (i.e., tracks which have not yet been recorded to) of the storage device 120 for recording, and automatically route the at least one audio signal to be recorded to the armed tracks. Thus, a user of the system 100 need not manually determine an available track, and arm the track(s) for recording before beginning the recording to the track(s).

Additionally, as the recording capabilities are integrated in the system 100, the user need not alter, switch or otherwise configure or reconfigure patch cables between an effects unit and a multi-track recorder to ensure that the audio signal will properly be routed to the correct track of the multi-track recorder 115. Thus, the possibilities of recording over previously recorded audio tracks, or of losing an audio signal due to improper configuration of the patch cables is substantially reduced, if not eliminated. Further, as the arming and routing may be accomplished automatically by the system 100, recording of a track may be accomplished promptly, allowing the user to focus on the creative processes of creating music, and not the technical process of setting-up and initializing the multi-track recorder for recording.

The multi-track recorder 115 may provide for the editing of audio tracks recorded at the multi-track recorder, including for example, deleting tracks, and adding to or replacing portions of recorded tracks. In addition, the multi-track recorder may provide a delay before initiating the recording of a track. Such a delay may be a delay of a predetermined time period (such as 3 seconds) after some event, for example actuation of a switch, and may be provided as a default for the system 100, and/or may be user-configurable. The predetermined delay may be provided as a pre-roll or count-off feature, by including an audio and/or a visual signal indicating a tempo for the recording. The pre-roll feature may also indicate when the recording or other performance is to begin, allowing for a synchronous and timely start of the performance, for example, when multiple musicians are being recorded.

The multi-track recorder 115 may additionally provide an always-recording capability where an audio signal (i.e., the received signal or the processed audio signal) is constantly recorded after a predetermined time period where the recording may be terminated by a user of the system 100. The predetermined time period may be, for example, at a power-up event of the system 100, after actuation event of a switch/button of the user interface 125, and the like. The system 100 further may include capabilities to edit/crop the recorded track to keep only those portions desired. Thus, a user may musically experiment and create various musical passages with no hindrance to creativity, and later keep only the portions/passages desired.

Further, the multi-track recorder 115 may automatically adjust signal levels, apply musical effects to, and/or perform filtering (for example, frequency-band related filtering such as enhancing the bass and the like) of an audio signal to be received and recorded. The multi-track recorded may additionally adjust the levels, panning, filtering, and/or apply musical effects to a received audio signal or recorded audio track to be monitored. Because the system 100 includes integrated recording capabilities, no adjustment to the signal level for the audio signal to be recorded may be necessary, as the audio signal monitored at the output signal port typically is representative of that which is being recorded. For example, the distortion that may be audible in the recorded audio track is that which is audibly present in the monitored audio signal. Thus, a possibility that the audio signal being recorded is distorted where the monitored signal sounds desirable is substantially eliminated. Further, where the signal is a stereo signal, the panning for the left and right channels of the audio signal may be set automatically, in accordance with system 100 default settings or as configured by the user. Thus, the user need not interrupt the creative process of creating music with that of ensuring the panning for the left and right channels is proper for the monitored signals. Additionally, if desired, panning information may be provided and/or configured for audio signals to be recorded where appropriate.

In addition, the multi-track recorder may allow for the automatic termination of the recording of an audio track when the recording time exceeds that of a longest previously recorded track. Thus, where a particular song comprises multiple audio tracks, the user of the system 100 need not focus attention on ending the recording of the particular track to match the recording time of a previously recorded track, but may instead concentrate on creating the music, knowing that the recording of the track will be automatically terminated.

The multi-track recorder may allow for the combination or merging of more than one recorded audio track onto a single audio track. In this way, when the user of the system 100 has generated more than one track with which he or she is satisfied, the user may merge the tracks to a single track, thereby freeing-up storage space on the storage device 120 for further audio tracks or audio signal recording time. Additionally, the system 100 allows for various recording qualities to be utilized when recording the audio tracks. As lower recording quality typically requires less storage space, a user of the system 100 may effectively extend the length of recorded audio tracks that may be stored on the storage device 120.

Further, the multi-track recorder may allow repetition/looping capabilities for a recorded audio track. The repetition/looping capabilities further may include quantizing capabilities for automatically editing/cropping the audio signal to fit within a predetermined time frame. Alternatively, or in addition, the repetition/looping capabilities may provide the quantizing of audio track(s) being repeated/looped for monitoring, for example, where the monitored audio track is adjusted automatically to fit within predetermined time frame without affecting (i.e., editing) any of the audio information of the repeated/looped audio track. For example, a music piece typically is quantized as measures, where each measure is made up of musical notes, the number and type of which depend often on the time-signature for that particular portion of the musical piece. The editing/cropping capabilities may be capable of cropping the audio signal to a predetermined or user-configurable length, such as a particular number of measures, or to a particular number of, or type of, notes within a measure. Alternatively, or in addition, the audio track may be left un-cropped, where the system 100 is capable of providing monitoring of that audio track to fit within the predetermined time frame.

The performance-mode capabilities may include any of automatically selecting a track for recording, automatically arming the track for recording, and automatically routing the audio signal to the track for recording. Additionally, or in the alternative, the performance-mode capabilities may include any of providing auto-stop, automatic deletion of an audio track, an always record feature, automatic panning, looping capabilities with or without quantization capabilities, and monitoring of the signal being recorded. Thus, any automation to the recording process at the multi-track recorder may be included as a performance-mode capability, however, the performance-mode capability may include any single, or any combination of, the mentioned functionalities.

The controller 110 typically is comprised of one or more microprocessors executing suitable programmed code stored in internal memory of the microprocessor and/or in the storage device 120. The microprocessor(s) are capable of providing the functionalities described herein. For example, the microprocessor(s) are sufficiently programmed for, and possess processing speeds and other hardware requirements for allowing the microprocessors to provide the functionalities. In addition, the microprocessor(s) may be capable of performing DSP, or other functionality required in implementing the system 100, as would be appreciated by one skilled in the art. In addition, the controller 110 may be comprised of any combination of hardware devices designed for specific functionalities (including, for example, application specific integrated circuits (ASIC) capable of providing functionality such as analog to digital and digital to analog conversions, particular DSP functionality and the like). The controller 110 also may be comprised of microprocessor(s) executing programmed code to achieve the functionalities described herein.

The multi-track recorder 115 typically comprises one or more microprocessors executing suitable programmed code stored internally, and/or in the storage device 120, to achieve the functionalities described herein. Such microprocessors may be capable of providing DSP functionality. Further, the multi-track recorder 115 may be comprised of any combination of hardware devices designed for specific functionalities and a microprocessor(s) executing programmed code. Additionally, or in the alternative, one or more of the multi-track recorder 115 functionalities may be incorporated in the hardware and software utilized to provide the functionalities of the controller 110. The multi-track recorder 115 may be an 8-track recorder, however, the multi-track recorder 115 may provide capabilities for recording any number of audio tracks. In addition, the multi-track recorder may be a digital multi-track recorder, where the audio tracks are represented in a digital format and stored on digital media.

The storage device 120 may comprise one or more fixed or removable storage devices including, but not limited to, solid state media, magnetic and optical media. The solid state media may include, but is not limited to, integrated circuits such as ROMs, PROMs, EPROMs, EEPROMs and any type of RAM, as well as removable memory storage devices such as a flash media card and any derivative memory systems of these devices. The magnetic media may include, but is not limited to, magnetic tape, magnetic disks such as floppy diskettes and hard disk drives. The optical media may include, but is not limited to, optical disks such as a Compact Disc. Typically, the storage device 120 includes working memory (RAM), a program memory portion, and an audio track storage device(s). The program memory portion may be provided, for example, as part of a ROM or PROM or as a portion of a hard disk drive provided in the unit. The audio track storage device may be used for recording information representing one or more recorded audio tracks and may be a EEPROM, a removable memory card, a portion of a hard disk drive, and/or a recordable optical disk, and the like.

The input signal ports 105 may include, but are not limited to, analog, digital and control input ports. The analog input ports may include, but are not limited to, a microphone input port, an instrument input port, and a stereo input port. The stereo input port may be used, for example, to connect the system 100 with an analog tape or optical disc (i.e., Compact Disc) player. The digital input ports may include, but are not limited to, an optical input port, a generalized input port, and an input port for receiving information and/or an audio signal(s) from a personal computer (PC) or other device communicatively coupled with the effects and recording system 100. The generalized input port may be utilized, for example, in receiving an S/PDIF signal to the system 100. The control input port may include, but is not limited to a MIDI input port or any derivative port input.

The output signal port 130 may include, but are not limited to analog, digital and control output ports and their derivatives. The analog output ports may include, but are not limited to, a microphone output port (i.e., for providing an audio signal to a mixing console), a headphone output port, a configurable output port(s), and left channel and right channel stereo output ports. The left channel and right channel stereo output ports may be utilized, for example, to provide the output signal to a power amplifier or a line input to a mixing console. The digital output ports may include, but are not limited to, an optical output port, a generalized digital output port, and an output port for providing information and/or an audio signal(s) to a personal computer (PC) or other device communicatively coupled with the effects and recording system 100. The generalized digital output port may be utilized, for example, or providing S/PDIF digital output signals from the system 100. The control output port may include, but is not limited to, a MIDI output port.

The user interface 120 provides access to various features and operations of the effects and recording system 100, and may include, but is not limited to, LED displays and devices and a control interface, such as one or more foot switches, allowing hands-free control of the effects and recording system 100, buttons for allowing selection of configurations and features of the system 100, LEDs indicating status information for various aspects and features of the system 100, and one or more displays for providing general information about the effects and recording system 100.

Although specific implementations for the effects and recording system are described, one skilled in the art would recognize that other implementations of hardware and/or software may be utilized to accomplish the described functionalities. For example, the system 100 may include an integrated power amplifier that may capable of driving one or more speaker(s) connected to an output port(s) of the system. Additionally, or in the alternative, the system 100 may include one or more integrated speakers that may be used to monitor the received audio signal and/or recorded audio tracks. In addition, a microphone may be integrated in the system 100, and may be utilized, for example, in receiving an audio signal at the system 100, and/or for receiving audible control signals such as for controlling operation of the effects and recording system.

Further, although some functionalities may be attributed to a particular component of the effects and recording system 100, one skilled in the art would realize that such functionalities may instead be carried out by or implemented in other components of the system 100. For example, various functionalities described as being provided by the multi-track recorder 115 may instead be carried out by or implemented in the controller 110 while still being within the scope of the invention. Further, both the effects and multi-track recording capabilities may be implemented in a single microprocessor capable of performing the functionalities described herein, as would be apparent to one skilled in the art.

Figure 2:
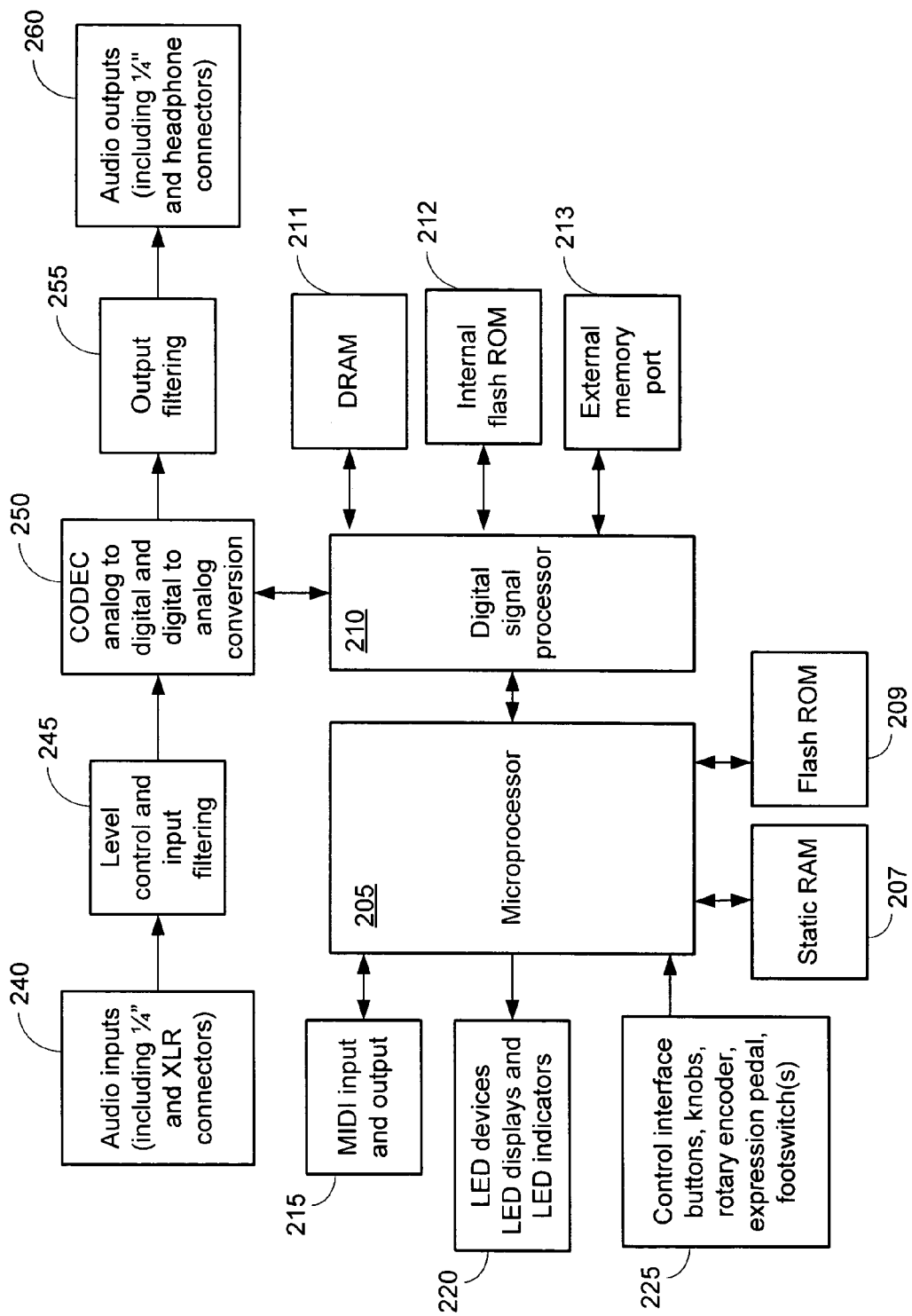
FIG. 2 is a more detailed functional block diagram of the effects and recording system of FIG. 1.

FIG. 2 is a more detailed functional block diagram of the effects and recording system 100 of FIG. 1. A microprocessor 205 is coupled with a digital signal processor (DSP) 210. The microprocessor 205 and DSP 210 may operate to control operation of the effects and recording system 100, including providing multi-track recorder functionality of the multi-track recorder 115 (FIG. 1), as well as application of musical effects and other features and functionalities for the effects and recording system 100. The microprocessor 205 is further coupled with a static RAM 207 and a flash ROM 209, where the static RAM 207 may provide a working memory for the microprocessor 205, and the flash ROM 209 may provide programmed code executable by the microprocessor 205 in carrying out the various functionalities and features implemented thereby.

The DSP 210 is further coupled with a DRAM 211, an internal flash ROM 212, and optionally may be coupled with a memory port connector 213 (i.e., an external flash ROM connector) for receiving a removable memory storage device such as a flash memory card (not shown). The DRAM 211 provides working memory for the DSP 210, where an internal flash ROM may include programmed code for controlling operation of the DSP 210 where necessary, and may provide memory for storing recorded audio tracks for multi-track recording functionalities provided by the system 100. The external flash ROM connected via the external memory port connector 213 may also provide storage for recording audio tracks for the multi-track recording capabilities.

The microprocessor 205 is further coupled with signal input ports and signal output ports (105 and 130 of FIG. 1), generally indicated by audio inputs 240, audio outputs 260 and external memory port 213. Further, the microprocessor 205 is further coupled with control input and control output ports such as MIDI ports 215. Such input, output and control ports are illustrated in an example effects and recording system back housing panel of FIG. 3.

Figures 3, 4:
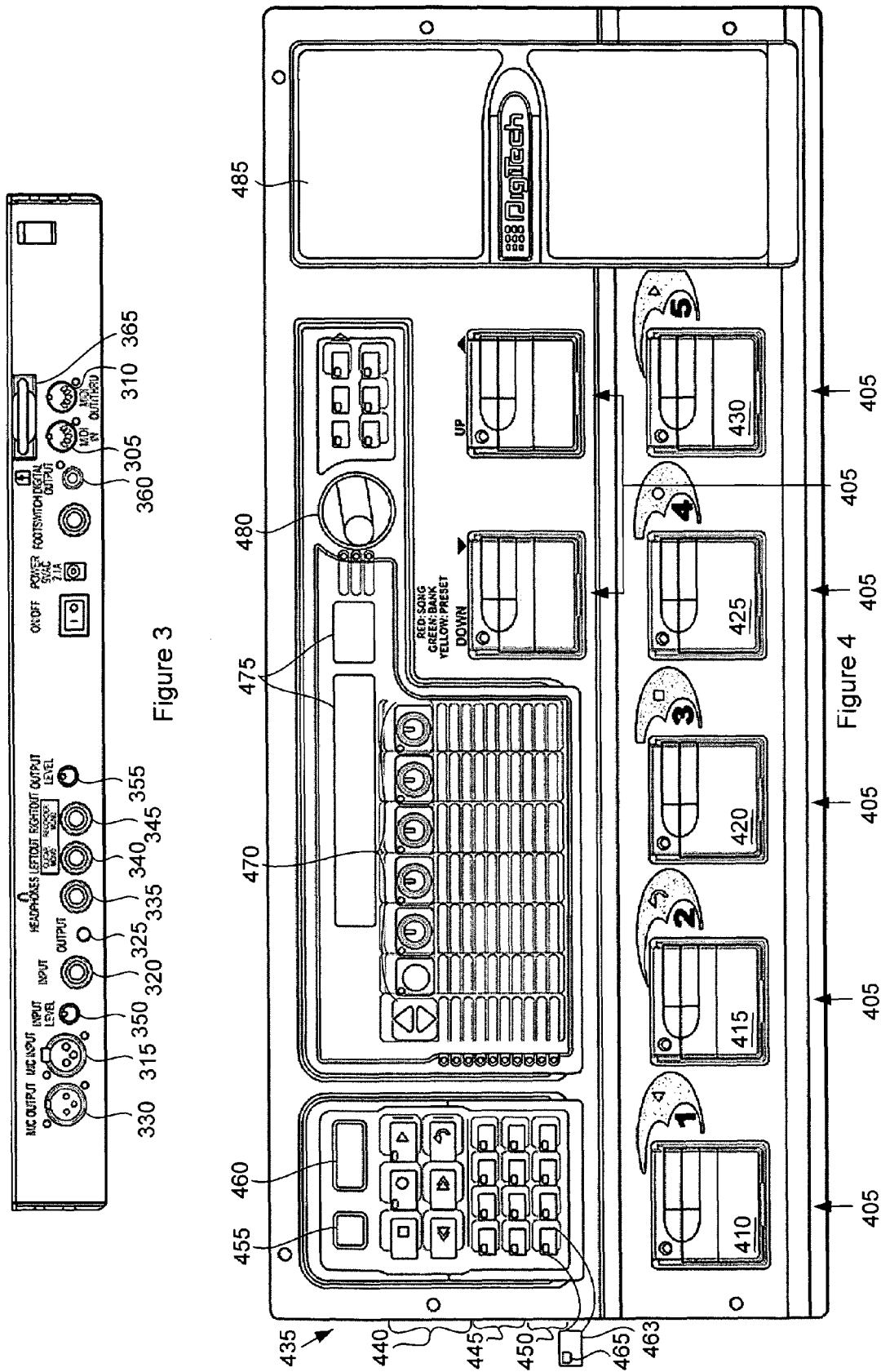
FIG. 3 is a plan view of a rear housing for an example effects and recording system, showing various input and output signal ports.
FIG. 4 is a plan view of a front housing of an example effects and recording system, showing various LED devices and control interfaces.

As shown in FIG. 3, a control import port such as MIDI input port 305 may be utilized for providing a MIDI signal or to provide timing or synchronization information/code in MIDI format to the effects and recording system 100. The audio inputs 240 (FIG. 2) may include a microphone input 315, an instrument input port 320, and a generalized input port 325. The microphone input 315 may be utilized in providing, for example, a voice and/or instrument input, where the instrument port 320 may be utilized in providing an audio signal from a musical instrument, for example, a guitar, keyboard and the like, for the effects and recording system 100. The generalized input port 325 may be utilized for providing an input from any audio signal source, including, for example, an optical disk player or a magnetic tape player. The generalized input port 325 may serve as an analog input port, or as a digital input port, for example, for receiving a digital input signal such as an S/PDIF signal. The external memory port 213 may be provided, for example, as a flash memory card port 365 to provide storage corresponding to one or more recorded audio tracks. In addition a PC interface (not shown) may be provided for receiving audio or other information from a PC for processing or other use, as discussed below.

The audio outputs 260 (FIG. 2) may include a microphone output port 330, a headphones port 335, and configurable output ports 340 and 345. The configurable ports 340 and 345 may be configured to provide mono outputs for a guitar or other instrument, and an external recording device respectively. Alternatively, the configurable output ports 340 and 345 may be utilized to provide, for example, a left output and right output channel for a stereo output signal to a mixer, amplifier, additional recorder, or other device coupled with the effects and recording system 100. A MIDI output port 310 may be utilized for proving a MIDI signal from the effects and recording system 100. A digital output port 360 may also be included to provide a digital output signal to a device coupled with the system 100, for example, as a S/PDIF output digital signal. In addition (not shown), the PC interface discussed above may be utilized to send audio or other information such as control information, to a PC coupled with the system 100. The sending of audio information may include streaming real-time audio to the PC, sending recorded audio track information to the PC, and/or sending system parameters status and timing information to the PC.

Further illustrated in FIG. 3 are input and output level control knobs 350 and 355, respectively, capable of adjusting the levels of audio signals received at and sent from the effects and recording system 100. The input level control knob 350 may allow for a gain of an input audio signal to be adjusted when necessary. For example, audio signals produced by some devices, such as many electrical guitars, keyboards, and the like, are typically provided at a substantially standardized level. In these cases, the input level of the audio signal received at the effects and recording system 100 typically does not need to be adjusted. However, audio signals received from other devices may not adhere to a standardized range, and thus, it may be desirable to adjust the levels of the audio signals received from such devices, for example, by increasing or decreasing the level of such audio signals. Alternatively (not shown), the control 350 may be replaced by a wide dynamic range auto-gain leveling circuit.

Returning to FIG. 2, the microprocessor is further coupled to various LED devices 220 such as LED displays and LED indicators, and a control interface 225 that may include buttons, knobs, rotary encoder(s), expression pedal(s), and foot switch(es), for example, providing the user interface 125 (FIG. 1). The LED devices 220 and control interface 225 indicate status information as well as general operating information for various functionalities and operations of the effects and recording system 100. Further, the control interface 225 allows selection of various features and configurations of the effects and recording system 100. FIG. 4 is a plan view of a front housing for an example effects and recording system 100, showing various LED devices 215 and control interfaces 225.

In FIG. 4, various buttons, knobs, a rotary encoder, an expression pedal and foot switches, as well as LEDs and other displays are illustrated, allowing control over operation of and configuration of the effects and recording system as well as displaying information regarding operation of the system. Foot switches 405 provide a hands-free interface for controlling, amongst other features and functions, recording and monitoring functionalities of the effects and recording system 100. For example, the foot switch 410 may allow rewinding back through a particular recorded audio track or a group of recorded audio tracks, where a foot switch 415 may allow deletion of the most previously recorded track. A foot switch 420 may be utilized to stop playback of recorded audio tracks, where a foot switch 425 may be utilized to initialize, select and arm one or more tracks for recording, and begin recording on the armed audio tracks. The foot switch 430 may be utilized to monitor/play back one or more recorded audio tracks.

Further, a recording interface pad, generally indicated at 435, is shown which includes various buttons and displays, utilized in accessing and displaying information regarding various recording and operations functionalities. For example, buttons 440 may be utilized in the initialization of and termination of recording and the monitoring of audio tracks, and for the editing of recorded audio tracks. Buttons 445 may be utilized in the selection of audio tracks to be recorded on and/or monitored, and for the merging of audio tracks. The buttons 450 may be utilized in accessing various features and operations of the recording functionality. Buttons 450 may provide feature and selections such as, for example, providing a drum audio track, controlling level/balance, and/or configuring various audio recording features or display information. Further, a display 455 and a display 460 may be provided. The display 455 may indicate a particular track which is being recorded to or monitored, and the display 460 may indicate timing information, such as time currently recorded to the displayed track, or a total time left for recording audio tracks with the current storage device of the system. Further, as illustrated at the expanded button 463, that may be representative of any buttons on the example front housing, each button may include an LED 465 indicating selection of the respective button, or configuration of one or more recording functionalities. The LED 465 may be a single-colored LED, or alternatively may be a multi-colored LED where the current color of the LED indicates a particular configuration or selection of recording or other features provided by the system 100. Further, control information from a user interface control, key, dial or button may be sent and/or received via the PC interface port.

Further illustrated, are various buttons and knobs, such as indicated at 470. These buttons or knobs may be utilized in controlling features such as selection of various musical effects. Additional displays 475 may be provided to display information regarding selected musical effects, or other features such as recording features and configurations. A data wheel 480 may be provided as an interface allowing a user to scan through various settings/configurations, for example, in selecting recording features or configurations, as discussed below. An expression pedal 485 further may be provided, allowing selection of various configurations or settings on the system 100, such as for selecting or altering musical effects provided by the system. Additionally, and as discussed above with respect to FIG. 3, the control interface 225 (FIG. 2) further may include the input and output level controls 350 and 355.

The various input and output ports, as well as user interfaces illustrated in FIG. 3 and FIG. 4 are merely examples, and the effects and recording system 100 may include more or fewer input/output ports and interfaces. For example, although not shown in FIG. 3 or FIG. 4, the PC interface port(s) may be utilized to receive information from and provide information to a personal computer, where such information may include operating and/or control information, or audio signal information.

Returning to FIG. 2, the audio inputs 240 may provide one or more audio signals to a level control and input filtering portion 245 of the effects and recording system 100. The audio signals may be analog and/or digital audio signals. The level control and input filtering portion 245 may include one or more of the knobs indicated at 225, for example to control the input level of signals received at one or more of the audio inputs 240 where necessary. The level control and input filtering portion 245 is further coupled with coder/decoder (CODEC) 250, which is capable of providing analog to digital conversion of an analog signal received at the audio inputs 240 where necessary, and for providing digital to analog conversion of a digital signal received from the DSP 210 where necessary, for example, to send to the output ports 260. The CODEC 250 is further coupled with an output filtering portion 255 for performing the filtering of an output signal from the effects and recording system 100, for example output signal leveling. The output filtering portion is further coupled with audio outputs 260 which may include, but are not limited to, mono and stereo output ports capable of being connected to an amplifier (i.e., guitar amplifier), a powered amplifier (i.e., public address amplifier), and a microphone output jack as discussed above. An example of the general operation of the effects and recording system 100 is illustrated in the flow chart of FIG. 5.

Figure 5:
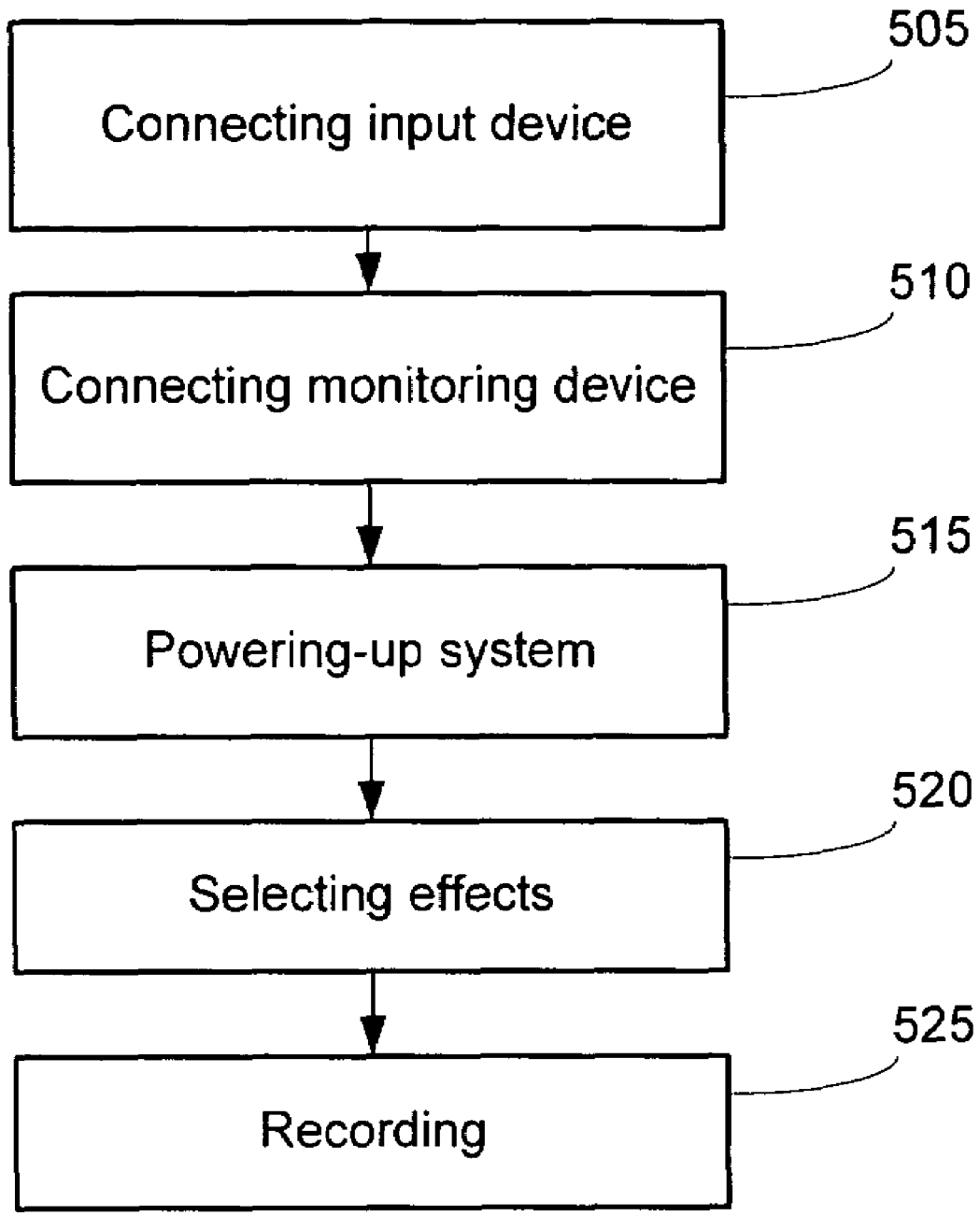
FIG. 5 is a flow chart illustrating general operation of the effects and recording system of FIG. 2.

As shown in FIG. 5, an input device is connected 505 with the effects and recording system 100 to provide an input signal to the system 100. Where the input device is an audio input device for providing an audio signal to the system 100, it may be connected, for example, via the audio inputs 240 of FIG. 2. Where the input device is a MIDI compatible device, for providing music control information, it may be connected to the system, for example, via MIDI jacks 215. The audio signal provided by the audio inputs 240 may be generated by voice or any musical instrument or device capable of generating an audio signal output. The audio signal further may be provided by a PC, as will be discussed below. As discussed above, the level of the audio signal may be adjusted using, for example, the input level control 350, if desired.

A monitoring device may then be connected 510. The monitoring device may be connected via any of the audio output jacks 260 of FIG. 2 and further described with respect to FIG. 3. The monitoring device may include, for example, an amplifier, speaker, headphones, a PC, or any other device capable of receiving the audio signal and providing an audible representation of the audio signal. Although not shown, the effects and recording system 100 may include an integrated power amplifier and/or speaker(s) allowing monitoring of an audio signal from the system 100.

The effects and recording system may then be powered-up 515. Various musical effects may be selected 520 using, for example, the various buttons, knobs, rotary encoders and/or expression pedals described with respect to the control interface 225, and as further shown/described with respect to FIG. 4. As discussed above, such effects may include, but are not limited to, adjusting speaker cabinet and/or amplifier models, pitch shifting, detuning, stomp box modeling, equalizer functionality, noise gate functionality, delay, reverb, chorus/modulation effects, dynamic-range compression, peak limiting, dynamic-range expansion, "slap-back" delay or any other filtration or processing for altering the sound of the received audio signal, to generate a processed audio signal. At least one of the received audio signal and processed audio signal may be recorded 525 at the effects and recording system 100 as will be discussed further below with respect to the flow chart of FIG. 6.

Because the system 100 integrates both effects capabilities and multi-track recording capabilities, the user may focus on musical creativity rather than the technicalities of device set up and operation. For example, the integrated effects and recording capabilities removes the requirement of and configuration of patch cables between an effects unit and a multi-track recorder, thus removing the possibility of incorrect signal routing between any effects unit and a multi-track recorder. Also, because the effects and recording capabilities are integrated, no signal level adjustment is necessary to be set for the recording functionalities to be utilized as the multi-track recording device is designed to utilize the signal as received at the system 100. Thus, any possibility that the audio signal being recorded is distorted where the monitored signal sounds desirable is substantially eliminated.

Figure 6:
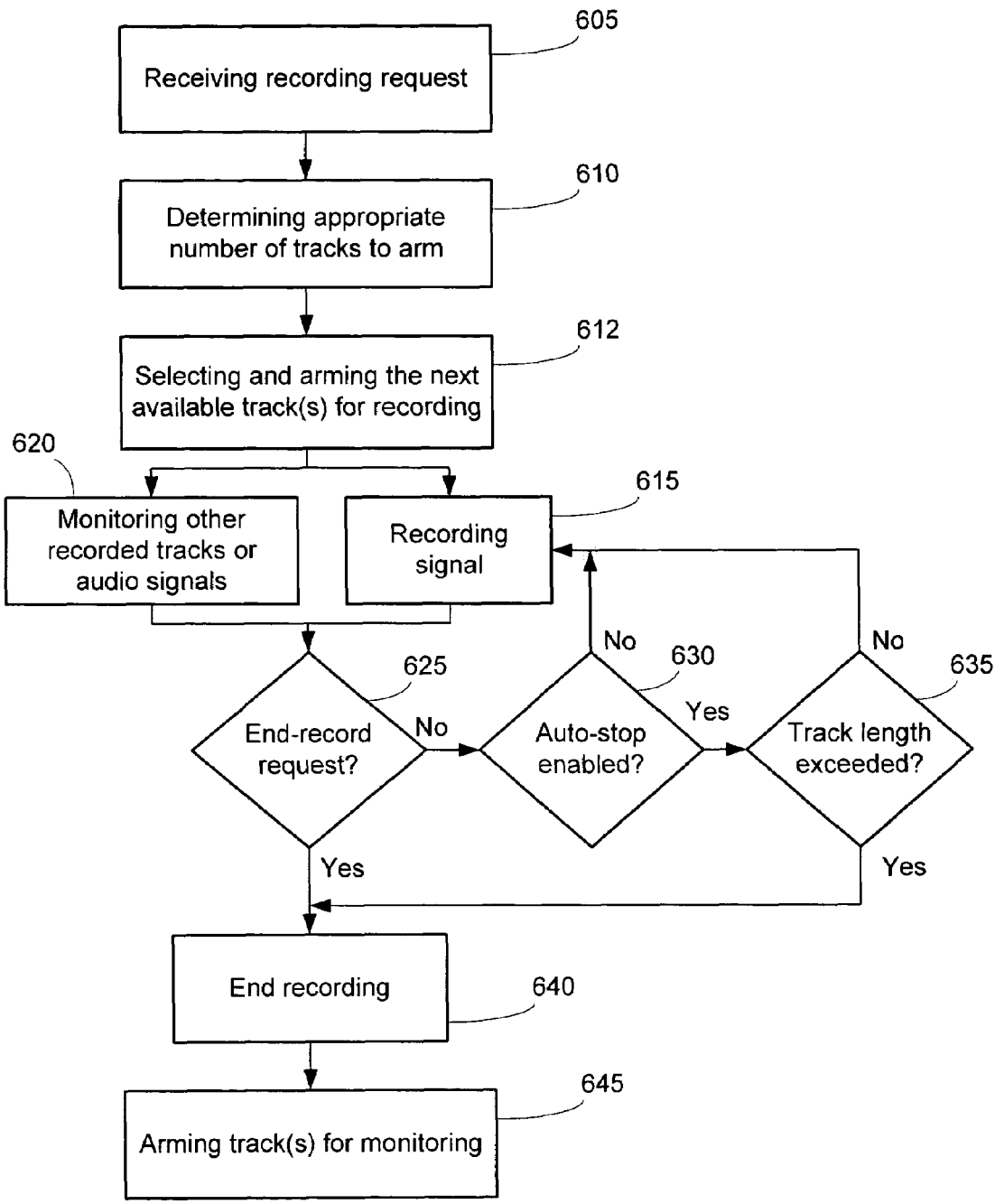
FIG. 6 is a flow chart illustrating recording using the effects and recording system of FIG. 2.

FIG. 6 is a flow chart illustrating recording a received or processed audio signal at the effects and recording system 100. As shown at FIG. 6, a recording request 605 is received at the effects and recording system 100. Such a recording request may include actuation of a button (i.e., record button of recording interface pad 435) or foot switch (i.e., for hands-free operation, such as record foot switch 425). Alternatively and not shown, a recording request may be made where a user speaks a word or phrase into a microphone of the effects and recording system 100, such as "record," or "begin record," where the microprocessor 205 and/or DSP 210 include voice recognition capabilities. For example, the effects and recording system 100 may include an integrated microphone for receiving such a voice command, or alternatively, such a command may be provided via a microphone connected with a microphone input port of the system, where the microprocessor 205 and/or the DSP 210 has capabilities for monitoring the received audio signal for particular words or phrases. Alternatively and not shown, a record request may be made where an audio signal at one of audio inputs 215 or 240 is detected by the microprocessor 205 or DSP 210, for example, as exceeding a predetermined signal level threshold, or as including frequencies within a particular predetermined frequency band. For example, such detection may be made on an audio signal provided by, for example, one of the audio inputs 240.

Upon receiving a recording request 605, a determination 610 is made regarding an appropriate number of tracks on the multi-track recorder to arm for recording. Audio tracks may be armed for various reasons in the effects and recording system 100. For example, one or more tracks may be armed for recording an audio signal by selecting the tracks to which the signal is to be recorded. For example, the selection of the tracks may be made by a user depressing buttons, such as the buttons 445 (FIG. 4) where a corresponding LED 465 on the button illuminates, or otherwise changes color, to indicate that the track has been selected for recording. Alternatively, and as will be discussed below, the arming of a track may be accomplished automatically by the system 100. Similarly, and as will be discussed below, recorded tracks may be armed by the user of, or automatically by, the system 100 for monitoring as well.

The appropriate number of tracks to arm on the multi-track recorder may be determined at 610. Where the received signal to be recorded is a stereo signal, it may be determined that two tracks are to be armed, and where the received signal is to be recorded as a mono signal, it may be determined that one track is to be armed. A determination regarding whether the received signal is mono or stereo may be made by determining which inputs of the effects and recording system 100 are being utilized to provide the input signal. For example, audio signals received from a stereo input are considered to be stereo audio signals, and those received via a mono audio input are considered to be mono audio signals. Alternatively, the microprocessor 205 and/or the DSP 210 may examine the audio signal received to determine whether it is a stereo signal or mono signal, by, for example, determining how may audio channels are present in the audio signal. Alternatively, such a determination may be made by a user-selected parameter at the effects and recording system 100, indicating whether the received signal is stereo or mono. Further, where the user desires a mono audio signal to be recorded where the input utilized for the received signal is a stereo input, the DSP 210 is capable of summing the received stereo input signal to a mono signal for recording.

In addition, the determination as to how many tracks to arm may include a determination (not shown) as to whether a dry-tracking feature has been enabled. Briefly, dry-tracking is a feature which allows both the received (raw) audio signal and the processed audio signal to be recorded, and will be discussed in further detail below. Where dry-tracking has been enabled, the appropriate number of tracks to be armed for an audio signal to be recorded as a mono audio signal may be two, and for an audio signal to be recorded as a stereo signal may be four.

Once a determination has been made as to an appropriate number of tracks to arm 610, the next available track(s) are automatically selected and armed for recording 612. In describing how the next available track(s) is selected, a little description of the recording process is useful. When recording, the effects and recording system 100 may create a recorded audio track by storing the audio signal for that audio track, for example, as a data file on the storage device. The data file may or may not be a compressed file format. Further, a format of the data file may include, but is not limited to an MP3, WMA, or any other audio file format, and/or may be in a proprietary file format.

Through a particular file naming convention, the file name may indicate the particular audio track to which the information in the file corresponds. For example, the file names for various tracks may be in a format "TRACKxx" where the xx indicates the particular track to which the audio information of the file corresponds. When recording at the effects and recording system 100, the microprocessor 205 and/or DSP 210 may generate new files corresponding to the track to be recorded at the time the audio track is created/recorded. Alternatively, files for all tracks capable of being recorded at the recording device may already be present in the storage device, where the file includes no information until its corresponding audio track has been recorded.

To select and arm the next appropriate track(s) for recording 612, the microprocessor 205 or the DSP 210 may access the storage device, for example, the internal flash ROM 212 or any external flash ROM connected via the external memory port 213. Where the effects and recording system 100 creates new files corresponding to recorded tracks as the tracks are recorded, the microprocessor 205 or the DSP 210 determines the next available track by utilizing the particular file naming convention. For example, where files named "TRACK01" through "TRACK04" are present in the storage device, it is determined that the next available track for recording will be "TRACK05". In this case, where a mono signal is to be recorded, the system 100 is armed for recording by generating the file "TRACK05," such that the information corresponding to any audio signal received for recording will be saved to the "TRACK05" file. Where dry-tracking is enabled, the files "TRACK05" and "TRACK06" would be created, one for the received audio signal and one for the processed audio signal.

Multiple, next available tracks may be determined in this fashion. For example, where the audio signal to be recorded is stereo, the microprocessor 205 or the DSP 210 may create two files named "TRACK05" and "TRACK06," to which information corresponding to the received audio signal will be stored. A left stereo channel may be stored to one of the newly generated tracks, where a right stereo channel will be stored to the other of the newly generated tracks. As discussed above, where the dry-tracking feature is enabled, additional tracks "TRACK07" and "TRACK08" may be generated to store the received audio signal as well.

However, where all files corresponding to all the tracks that may be recorded-to are already present on the storage device, the microprocessor 205 or the DSP 210 determines a next available file which is substantially empty (i.e., contains no audio signal information), and determines that this file (and thus the corresponding track) is the next available track for recording. Where the audio signal is to be recorded as mono, the information corresponding to the audio signal is placed in the next audio track (or may be placed in the next two audio tracks where dry-tracking is enabled). However, where the audio signal to be recorded is a stereo audio signal, the left and right channels may be placed in the next available two tracks respectively (or the next four tracks where dry-tracking is enabled).

In either case, an LED, for example the LED 465 on the buttons 445 corresponding to the particular track(s) being recorded to, may illuminate, or otherwise change in color, to indicate to a user that the particular track(s) is being utilized for recording. Alternatively, information may be displayed on any of the displays 455, 460, or 475 indicating which tracks are being utilized for recording the audio signal.

The file naming convention just described is for example purposes, and one skilled in the art would realize that other file naming conventions, or no file naming conventions may be utilized. For example, arbitrary file names may be utilized for storing information for recorded audio tracks, where the microprocessor 205 and/or the DSP 210 are capable of maintaining one or more data files including cross-reference information between a data file having an arbitrary file name, and the audio track that the data file corresponds to. Such cross-reference information may be provided and maintained, for example, as a database in the storage device for the system 100. Alternatively, where a file naming convention is not utilized, pointers or other means for determining specific locations on a storage media may be utilized. For example, the microprocessor 205 and/or DSP 210 may include information such as a pointer list of memory addresses regarding information stored on a particular portion of the storage device. Each pointer address may correspond to a memory portion for recording a new audio track. The microprocessor 205 and/or the DSP 210 may determine whether information representing an audio signal is present at various pointers, thereby determining whether the track represented by the corresponding pointer is available for recording. One skilled in the art would realize that information corresponding to various audio tracks may be stored to the storage device of the effects and recording system 100 in other fashions as well, and accordingly the above examples are intended as possibilities, and not limitations of the invention.

Once the appropriate number of tracks has been automatically determined 610 and selected and armed 612, an audio signal is recorded 615 to the selected tracks. A signal may be recorded, for example, by the CODEC 250 converting any analog audio signal received via audio input 240 to a digital signal, which is stored on a storage device at the effects and recording system 100, for example, internal flash ROM 212 or any external memory storage device such as flash ROM connected via external memory port 213. Alternatively, where a digital signal such as an S/PDIF signal is received, for example via the audio input port 240, the microprocessor 205 may cause the digital signal to be routed to the DSP 210 without any analog to digital conversion being performed at the CODEC 250, where it is stored to the storage device of the system 100. As discussed above, the information corresponding to the received audio signal (i.e., audio signal received via audio input 240) or any received control signal (i.e. control signal received via MIDI interface 215) may be stored in/as a file corresponding to the selected and armed track for recording.

The audio signal recorded 615 may be the audio signal received at one of the input ports of the system 100, or may be a processed audio signal which was received and to which musical effects have been applied, for example, by the microprocessor 205 and/or DSP 210. Where the audio signal is a processed audio signal, the system may utilize DSP to apply the effects and other processing to the audio signal, and store the resulting processed audio signal to the data file corresponding to the particular track being recorded. Alternatively, the received signal may be stored separately from the information regarding the musical effects and other processing information being applied. In this case, the microprocessor 205 and/or DSP 210 is capable of retrieving the audio information (i.e. the raw signal saved corresponding to the track) and retrieving the information regarding the effects and other processing to be applied to that track, where the effects and other processing information may be applied to the audio information while the particular track is being monitored.

While recording, the effects and recording system 100 may provide monitoring 620 of other previously recorded tracks via an analog output port or digital output port, for example, of the audio outputs 260, or via one or more integrated speakers. The analog output port may include, for example, a power amplifier and/or speaker port, and a headphone port. Alternatively, or in addition, monitoring 620 may include monitoring another audio input signal, for example, an audio signal provided by an optical disc player or magnetic tape player, while the recording 615 is being accomplished. Where the recording 615 is recording an audio signal from an input port such as a microphone, and the monitoring 620 is being provided via, for example, a speaker that may provide a potentially interfering audio signal through the microphone, one skilled in the art would realize that the microprocessor 205 and/or the DSP 210 may include capabilities for DSP canceling or attenuation of the direct audio signal provided by the speaker (or other monitoring device) and room ambience where necessary, from the audio signal being recorded at the microphone, to substantially remove any potential interference.

It is then determined whether an end-record request 625 has been received. The end-record request may be generated, for example, by a user actuating a button or foot switch of the effects and recording system 100, or by the user voicing a particular command such as "stop" or "end record" into an integrated microphone (not shown), or a microphone coupled via a microphone input port of the system 100, where the microprocessor 205 and/or the DSP 210 include voice recognition capabilities. Alternatively, the end-record request 625 may be made by the effects and recording system detecting an audio input of less than a predetermined level, or as not existing within a predetermined frequency band from one or more of the audio input jacks for a predetermined amount of time, for example 10 seconds. The predetermined amount of time may be provided as a system default, or as a user-configurable feature of the system 100.

Where an end-record request 625 has not been made, it is determined whether an auto-stop capability 630 which may be provided by the effects and recording system 100 has been enabled. The effects and recording system 100 may provide an auto-stop capability which automatically terminates recording 615 once a time has elapsed which is substantially equal to the time of a longest track recorded 635. A time of a longest track recorded may be determined by the microprocessor 205 and/or DSP 210, for example, by examining the files and determining from the information stored therein (i.e., an encoded time index for the track, or by determining from the amount of information within the track and a sampling rate at which the track was recorded the time of each track). This information may be gathered for each recorded track, and thus, the time of a longest recorded track may be determined.

Alternatively, the time of a longest track recorded may be determined using an index stored on the storage device that indicates recording times for various recorded tracks at the storage device. Such an index may comprise, for example, memory locations corresponding to each of the potentially available tracks that may be recorded to the storage device. Where it is determined that auto-stop has not been enabled 630, the recording 615 continues.

Where it has been determined that auto-stop capability has been enabled, it is determined by the microprocessor 205 and/or the DSP 210 whether the recording 615 has reached an elapsed time substantially equal to the longest track recorded 635. Where it is determined that the recording 615 has not reached an elapsed time substantially equal to that of the longest track recorded at the multi-track recorder, the recording 615 continues. However, where the elapsed recording time of the recorder 615 is determined to be substantially equal to that of the longest track recorded to the multi-track recorder 635, or where an end-record request 625 has been made, the recording is ended 640.

As discussed above, the audio tracks of the effects and recording system 100 may be armed for various purposes, including monitoring of a recorded signal on a particular audio track. When recording audio tracks on the system 100, it may be desirable to listen to other audio tracks which have already been recorded to the effects and recording system 100, to ensure that the current audio track being recorded is synchronous in time with those which have already been recorded. The track resulting from the recording 615 may be automatically armed for monitoring 645, such that this track may be automatically monitored by the user of the effects and recording system 100 when additional tracks are recorded at the system 100. The system 100 may provide a feature of automatically arming all audio tracks for monitoring, whether the audio tracks include audio information or not. The system 100, when providing the audio tracks to be monitored, may adjust a level of those audio tracks with no audio signal information to "0," effectively eliminating the monitoring of that respective audio track. Level adjustments as well as other adjustments to the audio tracks are discussed further below.

Because of the many automated recording functionalities provided by the effects and recording system 100, a user of the system 100 may focus on the creative process of creating music rather than the technical process of ensuring the proper steps have been taken for capturing the music. For example, as the appropriate numbers of tracks to arm may be determined 610 automatically by the system 100, and the next available track(s) may be selected and armed 612 for recording, the user need not switch from the creative music-creation process to the technical process of ensuring the recording is being done properly. Further, as the system 100 may automatically determine 610, select and arm 612 the effects and recording system 100 for recording, possibilities that already recorded tracks will be recorded over is substantially eliminated. In addition, as the effects and recording system 100 may include capabilities for automatically changing a particular track from being armed for recording to being armed for monitoring, a user need not consider this step when recording multiple tracks, and thus may continue to focus on the creative process of creating music. Thus, as many of the recording processes may be handled automatically by this effects and recording system 100, a user may simply, for example, record a first audio signal, for example, representing a first instrument or vocal, by depressing, for example, the foot switch 425 to initiate recording. The recording of that track may be ended by depressing the same, or a different foot switch, for example, the foot switch 420. Because of the automatic recording capabilities of the system 100, the user may then proceed, promptly, to recording a second audio signal as an audio track at the effects and recording system 100 by actuating, for example, the foot switch 425 to initiate recording of the second track.

In addition, the effects and recording system 100 is capable of allowing edit capabilities to tracks recorded at the multi-track recorder. For example, utilizing the buttons or foot switch indicated at control interface 225, and as further described with respect to FIG. 4, a user may select a particular track that is desired to be edited. Such editing may include, for example, deletion of an audio track, such as a most recently recorded track by pushing one of the buttons of the recording interface pad 435 or by actuating one of the foot switches 405 that may be configured for such functionality. Deletion of the audio track may be accomplished by the microprocessor 205 and/or the DSP 210 deleting the file corresponding to the audio track, or alternatively by deleting any audio signal information in the file corresponding to the audio track.

Additionally, such edit capabilities may include insertion of, or replacement of, a portion of an already recorded track allowing, for example, to overdub (i.e., overwrite) a particular musical phrase or portion of an instrument or voice recorded on the audio track. The flow chart of FIG. 7 illustrates replacement of a portion of an already recorded track.

Figure 7:
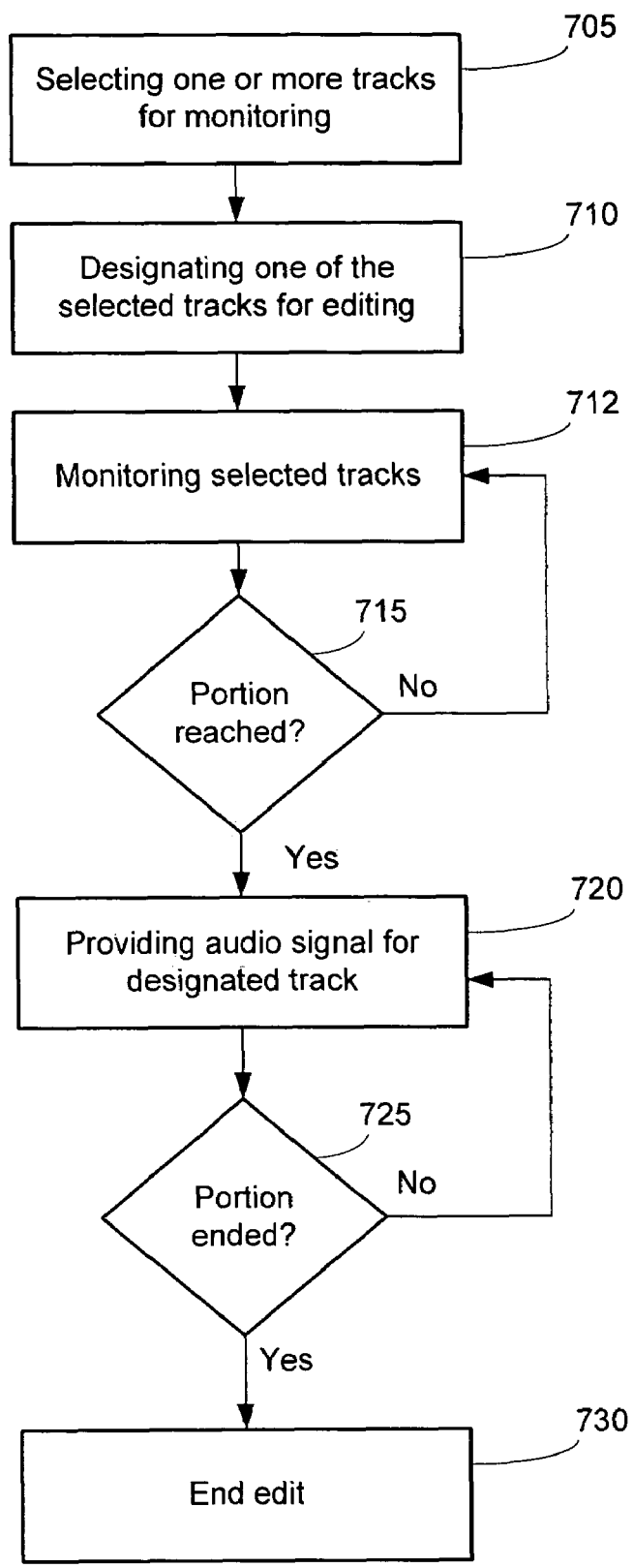
FIG. 7 is a flow chart illustrating editing a recorded audio track using the effects and recording system of FIG. 2.

As illustrated in FIG. 7, one or more of the tracks recorded at the system 100 may be selected 705 for monitoring, and one of the selected tracks may be designated 710 for editing. Monitoring 712 of the selected tracks is initiated, and it is determined whether the desired-replacement portion of the designated track has been reached 715. The desired-replacement portion is a portion of the particular track that the user wishes to overdub and may include, for example, a particular musical phrase or lick such as vocals or as generated by a musical instrument. Where the desired-replacement portion has not been reached, the monitoring 712 continues. However, where the desired-replacement portion has been reached, an audio signal is provided 720 for recording at the designated track. For example, the audio signal may be vocal or generated by an instrument, for the purpose of replacing the desired-replacement portion. It is then determined whether the replacement portion is complete 725. Where the replacement portion is not complete, the audio signal continues to be provided 720. However, where the replacement portion is complete 725, the edit is ended 730. One skilled would realize that further edits to the same audio track may be provided.

Although overdubbing has been described as being accomplished by monitoring the track and providing the audio signal when the portion of the track to be overdubbed has been reached, the overdubbing may be accomplished in alternate ways. For example, a user may select time indices of the audio track to be overdubbed, where the time indices indicate the beginning and end portion of the track to be overdubbed. The system 100 may determine from the time indices a length of the overdub. The system 100 may then allow recording of an audio signal of the determined length, and then utilize the recorded audio signal and the time indices to perform the overdubbing to the audio track.

A similar editing feature for insertion of an audio track into a recorded audio track may be provided by the system 100. Instead of using a newly received audio signal to overdub a portion of the recorded audio track, the new audio signal is inserted into the file representing the recorded audio track.

When performing the replacement or insertion editing capabilities, other buttons of the recording path 435 or foot switches 405 may be utilized to provide a fast forward scan through the audio track to facilitate arrival to the portion of the designated track for which replacement or insertion is desired.

Figure 8:
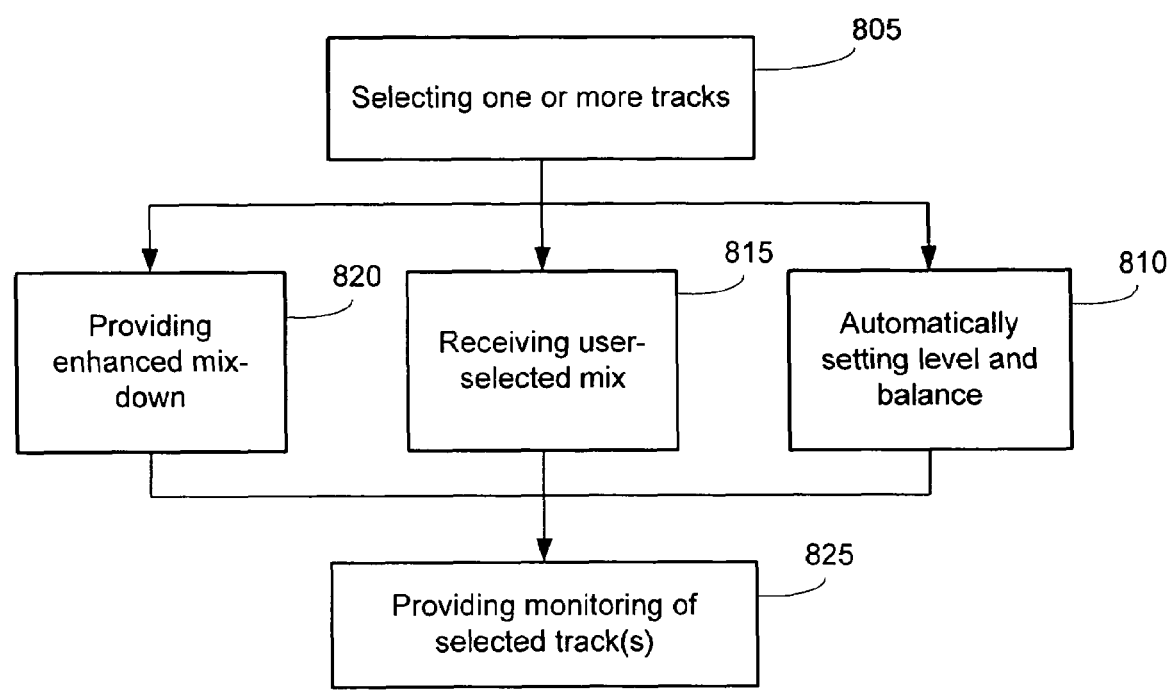
FIG. 8 is a flow chart illustrating monitoring a recorded audio track(s) using the effects and recording system of FIG. 2.

FIG. 8 is a flowchart illustrating the monitoring (i.e., the monitoring 620 of FIG. 6) of recorded tracks at the effects and recording system 100. Such monitoring may be accomplished as discussed with respect to FIG. 6, while a recording 615 is being accomplished. Alternatively, such monitoring may be accomplished independent of recording, where a user desires to achieve a particular effect or music mixdown of one or more tracks that have been recorded as will be discussed below.

One or more audio tracks are selected (armed) 805 for monitoring. The output signal level and output balance of one or more of the tracks may be automatically set 810 by the microprocessor 205 and/or DSP 210. For example, output signal level may be automatically set to unity (i.e., the same signal level as was received at the effects and recording system 100). The output balance may be automatically set such that a track representing a right stereo channel is panned to full right in the stereo field and a track recorded as a left stereo channel is panned to full left in the stereo field. Alternatively, and as shown in FIG. 8, a user may select 815 the output level and/or balance for one or more of the recorded tracks. The user may alter the output level and affect the panning of any output signal(s) using, for example, the buttons, knobs and foot switches indicated at 225 and as shown in FIG. 4.

In a further alternative shown in FIG. 8, the effects and recording system 100 may provide an enhanced mix-down feature 820. The enhanced mix-down feature is capable of accounting for an instrument, instrument type, or voice type, which is indicated as being recorded on the various tracks of the multi-track recorder, as well as accounting for a desired final music mix-down to be achieved. Responsive to the instrument or voice type, and the music mix-down, the system 100 is capable of tailoring the level, the balance, musical effects and/or performing filtering or other signal processing to one or more audio tracks, as will be discussed in greater detail below. Once the output level, balance, effects and/or filtering have been accomplished at 810, 815 or 820, one or more selected tracks may be monitored 825. As discussed above, such monitoring may occur while another audio track is being recorded, or may occur, independent of the recording of another track. Thus, the effects and recording system 100 provides the user capabilities for monitoring one or more of the audio tracks representing, for example, a particular song, and adjust output mixing (i.e., level, balance, effects and/or filtering) for the song to a desired output.

Figure 9:
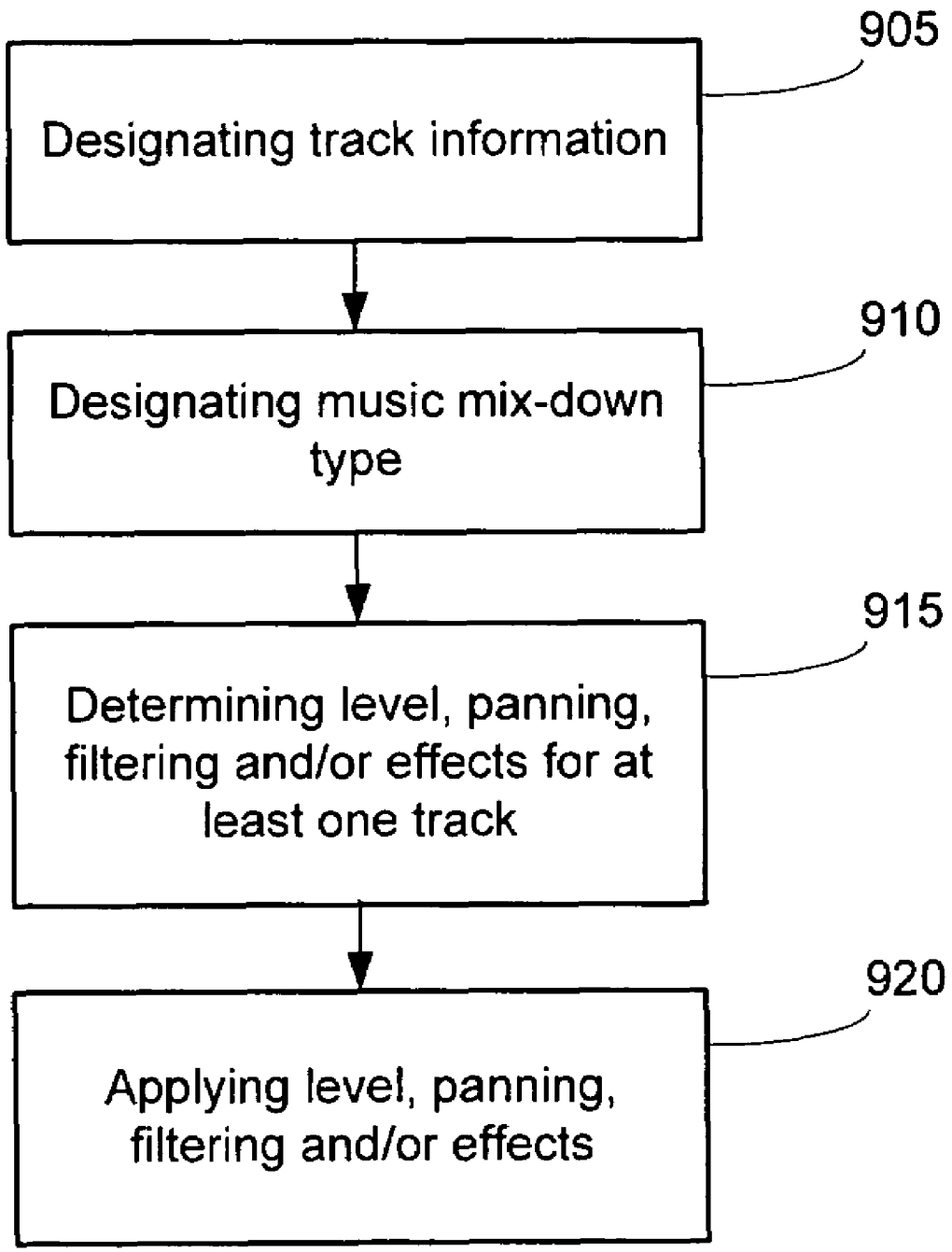
FIG. 9 is a flow chart illustrating an enhanced mix-down feature using the effects and recording system of FIG. 2.

FIG. 9 is a flow chart illustrating operation of the enhanced mix-down 820 of FIG. 8. As shown in FIG. 9, track information is designated 905, which may be utilized to specify the type of audio signal recorded on the track. For example, the track information may be designated as a particular instrument or instrument type, and/or a particular voice type. The instrument type may include, but is not limited to, string instrument, woodwind instrument, brass instrument, and percussion instrument types. The instruments may include, but are not limited to, guitar, electric guitar, acoustic guitar, bass guitar, clarinet, saxophone, trumpet, snare drum, base drum, piano, jazz piano and percussion instruments. The voice type may include, but is not limited to, lead vocal, back-up vocal, bass, alto, tenor, and soprano voice types. Such designations 905 may be made when the track is recorded, using for example the various buttons, knobs and other control interface features 225 and as further designated in FIG. 4. Alternatively, or in addition, track information may be designated or altered after a track has been recorded by selecting the particular track for which the information is desired to be altered, and designating 905 the information for that track. The information may be designated, for example, by the effects and recording system 100 providing a list of various instrument/voice types from which the track information may be selected.

Once track information is designated 905, a music mixdown is designated 910. The music mix-down may include, but is not limited to, classic rock, pop rock, jazz, blues, grunge, speed metal, fifties radio, bluegrass, rap, country, heavy metal, classical, dance, and oldies music mix-down types. Music mix-down designation 910 may be accomplished before, or after the recording of tracks for a particular song, and may be utilized by the system 100, and more particularly, for example, the microprocessor 205 and/or the DSP 210, in determining how the various tracks will be mixed.

Once music mix-down has been designated 910, level, balance, musical effects and/or filtering or other signal processing is determined 915 for one or more tracks which have been recorded at the effects and recording system 100. The level, balance, effects and/or filtering or other signal processing determination 915 may utilize at least one of the track information designating 905 and the music mix-down designating 910 to determine the level, balance, effects and/or filtering or other signal processing for at least one of the recorded tracks. The music mix-down designating 910 may be utilized in determining filtering for various instruments that may be recorded on the tracks, for example, boosting the base or treble of various recorded instruments. Such level, balance, effects and/or filtering or other signal processing designations may be stored, for example, as a data base within the system 100, such as within flash ROM 209 and/or internal flash ROM 212, and may be predetermined and/or configurable by a use of the effects and recording system 100. Typically, the level, balance, effects and/or filtering or other signal processing may allow for affecting the perceived placement, special relationship between instruments and/or voice recorded on one or more of the audio tracks of the system 100, for example, to tailor such placement, special relationships, and applying effects and/or filtering or other signal processing 920 to a particular music mix-down type. For example, for a jazz music mix-down, various instruments and voice audio tracks may be mixed to appear farther apart, whereas for a pop rock music mix-down, the instruments and voice on the audio tracks may be tailored to sound closer together. Further, the filtering of the audio signals on the audio tracks may be tailored for the particular music mix-down depending on the particular instrument and/or voice recorded on the track. For example, for a rap music mix-down, instruments and voice recording to one or more of the audio tracks may be mixed to amplify a bass frequency band. An example database format that may be utilized in providing an enhanced-mix is illustrated in tabular format in FIG. 10.

As shown in FIG. 10, a data base format may include a music mix-down 1005, a voice/instrument information 1010 (i.e., instrument or instrument type and voice type), panning information 1015, level information 1020 and other filtering/effects information 1030. For example, for a jazz music mix-down generally indicated at 1007, various voice/instrument designations for a particular track may be mixed-down in accordance with information provided for the panning 1015, level 1020, and filtering/effects 1030 information as specified. For example, for the jazz mix 1007, any tracks designated as being trumpet may be panned mono, stage-left such that the trumpet appears to be emanating from a stage-left location, reduced to 75% level, and include a small-club reverb effect. Any tracks designated as being saxophone audio signals may be mixed as panned mono, stage-right to emulate the saxophone as coming from the right side of a hypothetical stage, and having a gain 125%, with small-club reverb effects applied. In addition, as shown in FIG. 10, any tracks designated for piano may be mixed as stereo, stage-center, to emulate the piano as emanating from center stage, with unity gain, where frequencies in the treble range are enhanced and a small-club reverb effect is applied. Similar panning 1015, level 1020, and filtering/effects 1030 information may be provided for lead vocal, and back-up vocal as shown in FIG. 10.

Further, a particular mix such as the jazz music mix-down 1007 may include other instruments, designating various panning 1015, level 1020 and filtering/effects 1030 for the respective instrument/vocal type. In addition, additional mixing parameters in addition to panning 1015, level 1020 and filtering/effects 1030 may be provided and utilized in achieving the designated output mix as well. Where a particular instrument and/or voice type is indicated as being recorded on a particular track of the effects and recording system 100, however is not included within the database 1005 for the particular music mix-down, system default mixing parameters for balance 1015, level 1020 and filtering 1030 may be utilized. For example, panning 1015 may be set to center pan, where level 1020 is sent to unity gain and filtering 1030 is set to none.

Further shown in FIG. 10 is an example of a rap music mix-down 1035. In this example, tracks designated as including drums may be automatically set to center-pan, with 1.5 level, and bass-enhance filtering, thereby accentuating bass-aspects of a rap music mix-down. Tracks indicating lead vocal may be mixed as a mono, stage-center panning, with 125% gain, and filtering/effects applying enhanced bass filtering and slap-back echo effect. Additionally, similar enhanced-mix down may be provided for any drum or percussion capabilities provided within a built-in drum machine of the effects and recording system 100, which are not actually provided as a track on the multi-track recorder. As mentioned, the database represented in FIG. 10 is merely for example purposes, and further music mix-down types as well as voice and/or instrument information may be provided. For example, although not shown at FIG. 10, the voice/instrument information 1010 may instead include instrument types rather than instruments, for example, woodwind, brass, percussion, and the like, such that the balance 1015, level 1020, and filtering 1030 mix information are provided for the various voice/instrument types.

The filtering/effects 1030 provided in the example database of FIG. 10 have been described as being automatically applied to the audio track corresponding to a particular instrument. However, one skilled in the art would realize that, instead, when a particular instrument or voice type has been indicated for a track, the system 100 may provide a list of filtering/effects that may be applied to the instrument being recorded. Such a list is typically less than all of the available filtering/effects and other signal processing capabilities of the system, and may include filtering/effects and/or other signal processing functionality which are appropriate for the indicated instrument. For example, a list of filtering/effects selections for a lead-vocal voice type would most likely exclude a "wah" effect, which is more appropriate for an electric guitar or other instrument. The user may then select those filter/effects capabilities provided at the list, which are typically instrument-appropriate, to be applied to the audio track.

Although the flow chart of FIG. 9 discusses enhanced mix-down using one of instrument and instrument or voice type, and using music mix-down type, one skilled would realize that an output mix may be affected based on one of those parameters. Further, not all of panning, level, effects and filtering or other signal processing need be affected for one or more of the audio tracks provided at the output ports of the system 100. Additionally, or in the alternative, the system 100 may be configured to automatically select a filtering/effect or other signal processing option from the list. For example, the system 100 may select a first effect/filtering option of the list, or alternatively an effect/filtering option determined by the system 100 to be the most commonly utilized filtering/effect(s) option from the list for a particular instrument.

Additionally, the enhanced mix-down 820 may be configurable by a user of the system 100, where the user may add/alter music mix-down types 1005 and voice/instrument information 1010, as well as corresponding balance 1015, level 1020 and filtering 1030 information, for particular music mix-downs and instrument/voice types. Such editing/additions may be accomplished through the control interface 225, or may be designated via software running on a PC (not shown), coupled with the effects and recording system 100, and downloaded to the system 100. The list of selectable filtering, effects and/or other signal processing capabilities discussed above may also be provided to the musician as a configurable list, where effects, or other signal processing capabilities may be added to, or removed from, the list.

In addition, although the enhanced mix-down 820 is described as being applicable to the monitoring of recorded tracks, one skilled would realize that similar information regarding level, filtering/effects as well as other signal processing of an audio signal received at the effects and recording system 100 may be utilized when recording the audio signal. For example, when a particular track is indicated as corresponding to a particular instrument, level, filtering/effects or other signal processing capabilities similar to discussed above may be automatically applied to the audio signal being recorded. Additionally, or in the alternative, the system 100 may be configured to automatically select a first effect/filtering option of the list, or alternatively a most commonly utilized filtering/effect(s) option from the list for a particular instrument. Such level, filtering/effects or other signal processing information may be configurable by a user. Additionally, or in the alternative, the level, filtering/effects and/or other signal processing information may be provided as a selectable list for the musician. The list may include, for example, level, filtering/effects and/or other signal processing capabilities that may be appropriate to the instrument or voice type being recorded. Such a list may be configurable by the musician as well.

The effects and recording system 100 is further capable of allowing multiple tracks to be merged to a single track to conserve memory at the storage device of the system 100. FIG. 11 is flowchart illustrating merging of audio tracks.

As shown in FIG. 11, one or more recorded tracks may be selected 1105 for combination or merging. A target track may then be selected 1110, where the selected tracks are merged or combined onto the target track. The track selection may be accomplished by actuation of a button, for example, on the recording interface pad 435 (FIG. 4). The target track may be one of the tracks that was selected for merging, where information from the particular target track is buffered to allow recording on that track. Alternatively, the target track may be an additional audio track not yet recorded to. The audio tracks are then merged 1115, for example, by actuation of a button on the recording pad 435 or actuation of one of the foot switches 405. The merging may occur, for example, by the microprocessor 205 and/or the DSP 210 combining the audio information for each of the selected tracks into a single track in the case of a mono-recording, or two tracks in the case of a stereo recording, as would be appreciated by one skilled in the art.

Further, the effects and recording system 100 may be capable of providing a recording count down feature of a predetermined, or configurable time period before recording of an audio track begins. The predetermined delay may be provided as a pre-roll or count-off feature, by including an audio and/or a visual signal indicating a tempo for the recording. The audio signal may, for example, be a "tick," a beep, or other audio indication to the user, provided at a monitoring device of the system 100. The visual signal may be, for example, one or more LEDs or other lights that may be provided via the user interface, blinking at the tempo for the recording. The pre-roll feature may also indicate when the recording or other performance is to begin, allowing for a synchronous and timely start of the performance, for example, when multiple musicians are being recorded.

In addition, the effects and recording system 100 may employ an always recording function. In this circumstance, at a predetermined time, for example, at power-up or after a switch actuation, the effects and recording system 100 automatically begins recording at a next available track, where the recording is terminated upon actuation of a button or foot switch of the effects and recording system 100. The next available track may be determined, selected and armed, for example as discussed above with respect to the flow chart of FIG. 6. Capabilities for cropping a portion of the recorded track are provided so that unwanted audio may be deleted from the recorded track. Other buttons may be provided to a user to allow forward and reverse scanning through the recorded material when selecting any material to be deleted.

In addition, the effects and recording system 100 may allow a user to alter a recording quality for the effects and recording system 100, for example, to increase an amount of audio that may be recorded at the system 100. For example, an optical disc (i.e., Compact Disc) recording quality of 44.1 KHz may be selected. Alternatively, a user may select alternate sampling rates for the input audio signals, for example 22 KHz and 11 KHz sampling rates, thereby affecting the length of track times that may be stored at the system 100. The sample rates may be provided as system defaults, or may be configured or entered by a user of the system 100.

Further, where the effects and recording system 100 utilizes a proprietary recording format to record audio tracks, the system may include capabilities for converting the proprietary format of the stored audio tracks to a standardized format such as a .WAV, MP3, WMA audio file, thereby allowing the recorded audio tracks to be accessed by a PC. Thus, the microprocessor 205 and/or DSP 210 may include programmed code for accomplishing the conversion from the proprietary format to the standardized format. Such converting may be accomplished responsive to any buttons, knobs, or switches actuated at the effects and recording system 100. Alternatively, the effects and recording system 100 may be configured to automatically convert any proprietary recording format utilized to standardized format, for example, by a user-selectable option provided via the system 100.

In addition, the effects and recording system 100 may provide drum and other percussion capabilities. For example, such capabilities may be provided as a user selectable parameter, at the output port. Alternatively, the user may select various percussion instruments, tempos, and/or rhythms and record them to a particular track for monitoring with the other recorded tracks.

In addition, the effects and recording system 100 may provide seamless-looping capabilities, where a short audio clip of a particular length is recorded, and continually repeated until, for example, a longest recorded track playback elapsed time is reached. Such a seamless-looping capability may include automatic cropping of a portion of the signal to ensure that the timing length is correct to a predetermined threshold, for example to a nearest eighth note, quarter note, or music measure, thereby correcting problems where, for example, a recorded audio track is not of a length of time which is equally-divisable by the longest recorded track time. Alternatively, or in addition, the repetition/looping capabilities may provide the audio track(s) being repeated/looped for monitoring, where the monitored audio track is adjusted automatically to fit within predetermined time frame without affecting (i.e., deleting) any of the audio information of the repeated/looped audio track. For example, where the musician desires to have a desired guitar lick length of four measures repeat continuously for an entire song represented by the tracks recorded at the system 100, he or she records the lick on one of the audio tracks. However, when terminating the recording of the lick, the musician inadvertently terminates the lick such that the actual recording is slightly (i.e., one beat) more than four measures. When the seamless-looping feature is utilized, the system 100 is capable of quantizing the recorded audio track so that only four measures (and not the four measures with the superfluous beat) are repeated throughout the song. Alternatively, or in addition, the seamless looping capability may allow the short audio track recorded to be monitored independent of any other tracks, where the monitoring of the seamless audio track may be terminated by the musician, for example, by actuating a foot switch of the system.

Additionally, the effects and recording system 100 may provide dry-tracking capabilities, where both the processed audio signal and the received audio signal (raw signal with no effects or other processing) are recorded on the storage device. Thus, when the audio track is being monitored, the musical effects capabilities of the effects and recording system 100 may be applied to the raw recorded audio signal, and continually altered until a desired musical effect is achieved. Further, once the desired musical effects have been determined, the effects and recording system 100 may be capable of allowing the recording of the raw received audio signal with the desired effects applied thereto, to the same or a different audio track at the system 100. Such recording may be accomplished, for example, as discussed above with respect to the flowchart of FIG. 6. In this way, a user of the system 100 may record a raw audio track, and experiment on the raw, recorded audio track with various musical effects until a desired effect is created. Alternatively, the dry-tracking may include recording only the raw, received signal at the storage device, where the processed audio signal may be provided for monitoring by the system 100.

The multi-track recorder typically stores the audio tracks as digital files on the storage media, as discussed above. However, the multi-track recorder may store the tracks as analog information on the storage media 120, where the storage media 120 may include a magnetic tape. In this case, the microprocessor 205 and/or DSP 210 have capabilities of scanning forward and backward on the audio tape to determine whether an audio signal has been recorded to a particular portion/track of the magnetic tape. Thus, when automatically selecting a next available track for recording, the microprocessor 205 and/or the DSP 210 may scan through the magnetic tape until it determines the next available track to be recorded to, at which time that track would be armed for recording.

As discussed above, the effects and recording system 100 may be coupled with a PC. The coupled PC may utilize recording software, which may allow recording functions to be accessed through the interface between the PC and the effects and recording system 100. Such an interface may include a universal serial bus (USB) port, an IEEE 1394 port, an ethernet port, a serial port, a parallel port, or any other communications port capable of conveying information between the PC and the effects and recording system 100.

The PC may operate under programmed code allowing it to provide one or more of the functionalities described herein. Further, when coupled with a PC, the effects and recording system 100 may utilize a hard disk drive, or other storage device of the PC, when recording tracks of information, thereby potentially extending the amount of audio signal which may be recorded. Further, the effects and recording system 100 may be capable of accessing audio files recorded at the PC, for example in a standardized file format such as a .WAV, MP3, and WMA audio file format, and where necessary, converting the audio files to a file format which may be utilized by the system 100 (i.e., where the system 100 utilizes a proprietary format). Where audio files are provided from the PC, various information may be configured for such audio files such as instrument/voice type and music mix-down information, so that various features of the system 100 may be utilized and/or applied to the provided audio files, for example the enhanced mix-down features, monitoring or recording features described herein. In addition, the effects and recording system may instead be completely implemented on a PC which is sufficiently programmed for carrying out the functionalities described herein, and which may have one or more of the audio input ports discussed herein.

The effects and recording system 100 may have capabilities for recording 8 audio tracks, or any other number of audio tracks, while allowing the various features and capabilities described herein to be utilized. Further, and as discussed above, other hardware and/or software combinations may be utilized to implement the system 100 within the scope of the invention. In addition, the effects and recording system 100 may include input ports, output ports as well as circuitry with programmed code for receiving, recording, and processing audio signals having greater than stereo, multi-channel audio. Further, such received, processed and or recorded audio signals may be provided by the effects and recording system 100 for monitoring, or for communication to a PC or other device communicatively coupled with the system 100.

While various embodiments of the invention have been described, it will be apparent to those of ordinary skill in the art that may more embodiments and implementations are possible that are within the scope of the invention.

What is claimed is:

1. A method of recording an audio signal, comprising:
   receiving an input audio signal;
   generating a processed audio signal from the input audio signal;
   initiating recording of the processed audio signal as a first additional audio track on a storage device comprising one or more existing audio tracks;
   identifying a longest recorded track from among the one or more existing audio tracks and a corresponding longest track length;
   monitoring a track length of the first additional audio track as it is recorded; and
   automatically terminating the recording of the first additional audio track when the track length of the first additional audio track is substantially equal to the longest track length.

2. The method of claim 1, where the processed audio signal is recorded as a stereo signal, and further comprising automatically routing a left channel and a right channel of the processed audio signal to a respective first and second available track of the storage device.

3. The method of claim 1, where the processed audio signal comprises a stereo signal having a left channel and a right channel, to be recorded as a mono signal, and further comprising:
   summing the left channel and the right channel to a mono signal; and
   automatically routing the mono signal to an available track of the storage device.

4. The method of claim 1, where initiating comprises initiating recording of the processed audio signal in response to actuation of a switch.

5. The method of claim 4 further comprising initiating recording of the processed audio signal responsive to actuation of a foot switch.

6. The method of claim 1, where the storage device comprises at least one of a solid state storage device, a magnetic storage device and an optical storage device.

7. The method of claim 6, where the solid state storage device comprises a flash memory card.

8. The method of claim 1 further comprising recording the processed audio signal as at least one file on a storage device.

9. The method of claim 1 further comprising:
   recording the input audio signal at the storage device as a recorded audio signal;
   applying at least one musical effect to the recorded audio signal; and
   providing the recorded audio signal, with the at least one applied effect, to an output signal port of an effects and recording system.

10. The method of claim 1 further comprising:
    setting a recording level for a multi-track recorder by setting an input level of the input audio signal at an effects and recording system comprising the multi-track recorder.

11. The method of claim 1 further comprising automatically setting stereo track panning for the recording of the processed audio signal.

12. The method of claim 11 further comprising setting a gain of the recording to a unity gain.

13. The method of claim 11, where the audio recording includes a left channel and a right channel, and further comprising:
    automatically setting the stereo track panning for the left channel to a full-left pan; and
    automatically setting the stereo track panning for the right channel to a full-right pan.

14. The method of claim 1, where the recording is initiated at a predetermined time, and further comprising allowing recording termination responsive to a switch actuation.

15. The method of claim 14 further comprising allowing cropping of the recorded processed audio signal.

16. The method of claim 14 where the switch is a foot switch.

17. The method of claim 14 where the predetermined time is at power-up of the system.

18. The method of claim 1 further comprising:
allowing a selection of at least one of an instrument type, a music mix-down type, and a voice type;
mixing the recorded processed audio signal responsive to the selection; and
providing the mixed recorded processed audio signal at an output of a multi-effect unit.

19. The method of claim 18 where the music mix-down type includes at least one of classic rock, pop rock, jazz, blues, grunge, speed metal, fifties radio, bluegrass, rap, country, heavy metal, classical, dance, and oldies music mix-down types.

20. The method of claim 18 where the voice type includes at least one of lead vocals, back-up vocals, bass, alto, tenor, and soprano voice types.

21. The method of claim 18 further comprising adjusting at least one of panning, effects application levels and post-processing of the recorded processed audio signal responsive to the selection.

22. The method of claim 21 further comprising adjusting panning for the recorded processed audio signal to affect apparent placement of at least one instrument recorded at the storage device.

23. The method of claim 21 further comprising adjusting post-processing to affect a particular frequency band of the recorded processed audio signal responsive to the selection.

24. The method of claim 18 further comprising:
providing a database including information describing a desired mix for at least one of the instrument types and the music mix-down types; and
mixing the recorded processed audio signal responsive to the database information.

25. The method of claim 24 further comprising:
providing the database including information describing a desired mix for a plurality of combinations of instrument type and music mix-down type; and
mixing and processing the recorded processed audio signal responsive to the database information.

26. The method of claim 1 further comprising providing the recorded processed audio signal at an output signal port of an effects and recording system.

27. The method of claim 26 further comprising providing the processed audio signal at the output signal port of the effects and recording system.

28. The method of claim 1 further comprising selecting a recording quality for recording the processed audio signal at a storage device.

29. The method of claim 1 further comprising providing editing capabilities to audio signals recorded on a storage device.

30. The method of claim 29 further comprising providing deletion of the recorded processed audio signal responsive to a switch actuation.

31. The method of claim 29 further comprising allowing replacement of a portion of the recorded processed audio signal.

32. The method of claim 31 further comprising:
selecting a recorded audio signal for which a portion is to be replaced;
providing the selected recorded audio signal at an output signal port of an effects and recording system;
inserting a desired audio signal at a beginning of the portion; and
terminating the insertion.

33. The method of claim 1 where recording is initiated after a predetermined delay time.

34. The method of claim 32 further comprising providing the predetermined delay time.

35. The method of claim 1 further comprising:
determining a music tempo for the input audio signal;
determining a length of the recorded processed audio signal;
altering the recorded processed audio signal to within a predetermined tempo increment; and
providing the altered recorded processed audio signal to an output signal port of an effects and recording system.

36. The method of claim 35 where the predetermined tempo increment is an eighth note.

37. The method of claim 35 where the predetermined tempo increment is configurable.

38. An effects and recording system for processing an audio signal, comprising:
at least one input audio port operable to receive an input audio signal;
a controller coupled with the at least one input audio port and capable of receiving the input audio signal and generating a processed audio signal from the input audio signal;
a storage device coupled with the controller; and
a multi-track recorder coupled with the controller and the storage device, where the multi-track recorder is capable of:
initiating recording of the processed audio signal as a first additional audio track on the storage device comprising one or more existing audio tracks;
identifying a longest recorded track from among the one or more existing audio tracks and a corresponding longest track length;
monitoring a track length of the first additional audio track as it is recorded; and
automatically terminating the recording of the first additional audio track when the track length of the first additional audio track is substantially equal to the longest track length.

39. The system of claim 38, where the processed audio signal is a stereo signal having a left channel and a right channel, to be recorded at the storage device as a mono signal, and where the controller is capable of:
summing the left channel and the right channel to a mono signal;
determining an available track on the storage device for recording an audio signal; and
automatically routing the mono signal to the available track of the storage device.

40. The system of claim 38, where the processed audio signal is a stereo signal having a left channel and a right channel, and where the controller is capable of:
determining a first available track and a second available track on the storage device for recording an audio signal; and
automatically routing the left channel to one of the first and second available tracks of the storage device; and
automatically routing the right channel to the other of the first and second available tracks of the storage device.

41. The system of claim 38 further comprising a user interface including at least one switch, where the multi-track recorder stores the processed audio signal on the storage device responsive to actuation of the switch.

42. The system of claim 41 where the switch comprises at least one of a push-button switch, a selector dial, a foot-switch, and a foot pedal.

43. The system of claim 41 where the multi-track recorder is capable of providing a recording-delay for a predetermined time after actuation of the switch.

44. The system of claim 38 where the storage device comprises at least one of a solid state storage device, a magnetic storage device and an optical storage device.

45. The system of claim 44 where the magnetic storage device comprises at least one of magnetic tape, a floppy diskette, and a hard disk drive.

46. The system of claim 44 where the solid state storage device comprises at least one of an integrated circuit memory, and a removable magnetic memory card.

47. The system of claim 38 where the multi-track recorder is capable of recording the processed audio signal as a respective file on the storage device.

48. The system of claim 38 further comprising at least one output signal port for providing at least one recorded audio signal to an external device, where the external device comprises at least one of a personal computer, a speaker, an amplifier, a headphone set, and a mixer.

49. The system of claim 48 where the controller is capable of:
providing musical effects to the recorded audio signal to generate a processed recorded audio signal; and
providing the processed recorded audio signal to at least one of the output signal ports.

50. The system of claim 49, where the musical effects include at least one of selecting a speaker cabinet model, selecting an amplifier model, pitch shifting, detuning, stomp box modeling, equalizer functionality, noise gate functionality, delay, reverb, chorus/modulation effects, dynamic-range compression, peak limiting, dynamic-range expansion, and slap-back delay musical effects.

51. The system of claim 48 where the at least one output signal port comprises at least one of an analog output signal port and a digital output signal port.

52. The system of claim 51 where the analog output signal port comprises at least one of a microphone jack, a mono audio output jack, a stereo audio output jack, and a configurable audio output jack.

53. The system of claim 51 where the digital output signal port comprises at least a MIDI output signal port, an S/PDIF output jack, a PC interface, and an external memory device port.

54. The system of claim 48 further comprising an output mixer coupled with the controller and the output signal port, capable of affecting at least one of a level, panning, effects application and filtering of the audio signal provided at the output signal port.

55. The system of claim 48 where the controller is capable of affecting at least one of a level, panning, effects application and filtering of the audio signal provided at the output signal port.

56. The system of claim 55 where the controller is capable of affecting at least one of a level, panning, effects application and filtering of the audio signal provided at the output signal port responsive to at least one of recording track information and music mix-down type information.

57. The system of claim 56 where the recording track information comprises at least one of an instrument type and a voice type.

58. The system of claim 56 where the filtering comprises enhancing a particular frequency band of the audio signal provided at the at least one output audio port.

59. The system of claim 55 where the storage device includes a database having information regarding at least one of panning, effects application level, and filtering information for at least one of an instrument, instrument type, and voice type, for at least one music mix-down type, where the controller is capable of affecting at least one of the level, panning, effects application and filtering of the audio signal provided at the output signal port responsive to information from the database.

60. The system of claim 38 where the at least one input signal port comprises at least one of an analog input signal port and a digital input signal port.

61. The system of claim 60 where the analog input signal port comprises at least one of a microphone input jack, an instrument input jack, and a general external device input jack.

62. The system of claim 60 where the digital signal input signal port comprises at least one of a MIDI input signal port, a personal computer interface port, and an external memory interface port.

63. The system of claim 38, where the multi-track recorder begins recording of an audio signal at a predetermined time, and further comprising:
a switch coupled with the multi-track recorder,
where the multi-track recorder is capable of terminating the recording responsive to actuation of the switch.

64. The system of claim 63 where the predetermined time is at power-up of the system.

65. The system of claim 63 where the multi-track recorder is capable of providing editing capabilities to the recorded audio signal.

66. The system of claim 65 where the editing capabilities comprise deletion of the recorded audio signal.

67. The system of claim 65 where the editing capabilities comprise replacement of a portion of the recorded signal.

68. The system of claim 38 where the multi-track recorder is further capable of:
determining a music tempo for the recorded processed audio signal;
determining a length of the recorded processed audio signal;
altering the recorded processed audio signal to within a predetermined tempo increment; and
providing the altered recorded processed audio signal to an output signal port of the effects and recording system.

69. The system of claim 68 where the predetermined tempo increment is an eighth note.

70. The system of claim 38 where the controller comprises a microprocessor, operating under computer programmed code to provide for receiving the input audio signal, and applying a musical effect to the received input audio signal to generate the processed audio signal.

71. The system of claim 70 where the microprocessor is a first microprocessor, and where the multi-track recorder comprises a second microprocessor operating under computer programmed code to provide for storing the processed audio signal at the storage device.

72. The system of claim 71 where the first microprocessor and the second microprocessor are provided as a single microprocessor operating under computer programmed code for receiving the audio signal, and applying a musical effect to the received input audio signal to generate the processed audio signal, and for storing at least one of the received input audio signal and the processed audio signal at the storage device.

73. The system of claim 38 where the multi-track recorder comprises a microprocessor operating under computer programmed code to provide for storing the processed audio signal at the storage device.

74. A storage media for use with a processor of an audio system, comprising:
a memory portion programmed for allowing receipt of an input audio signal, generating a processed audio signal from the input audio signal at the controller, initiating recording of the processed audio signal as a first additional audio track on a storage device comprising one or more existing audio tracks, identifying a longest recorded track from among the one or more existing audio tracks and a corresponding longest track length, monitoring a track length of the first additional audio track as it is recorded, and automatically terminating the recording of the first additional audio track when the track length of the first additional audio track is substantially equal to the longest track length.

75. An effects and recording system for processing an audio signal, comprising:
means for receiving an input audio signal at the system;
means for generating a processed audio signal from the input audio signal;
means for initiating recording of the processed audio signal as a first additional audio track on a storage device comprising one or more existing audio tracks;
means for identifying a longest recorded track from among the one or more existing audio tracks and a corresponding longest track length;
means for monitoring a track length of the first additional audio track as it is recorded; and
means for automatically terminating the recording of the first additional audio track when the track length of the first additional audio track is substantially equal to the longest track length.

76. The system of claim 75 further comprising means for recording the processed audio signal as a respective file on the storage device.

77. The system of claim 75 further comprising means for providing at least one recorded audio signal to an external device.

78. The system of claim 77 further comprising:
means for providing musical effects to the recorded audio signal to generate a processed recorded audio signal; and
means for providing the processed recorded audio signal to the external device.

79. The system of claim 77 further comprising means for affecting at least one of a level, panning, effects application and filtering of the audio signal provided to the external device.

80. The system of claim 75 further comprising:
means for receiving at least one of recording track information and music mix-down type information; and
means for affecting at least one of a level, panning, effects application and filtering of the audio signal responsive to at least one of recording track information and music mix-down type information.

81. The system of claim 80 where the musical effects include at least one of selecting a speaker cabinet model, selecting an amplifier model, pitch shifting, detuning, stomp box modeling, equalizer functionality, noise gate functionality, delay, reverb, chorus/modulation effects, dynamic-range compression, peak limiting, dynamic-range expansion, and slap-back delay musical effects.

82. The system of claim 80 further comprising means for enhancing a particular frequency band of an audio signal provided to an external device.

83. The system of claim 75, where the multi-track recorder begins recording of an audio signal at a predetermined time, and further comprising means for terminating the recording responsive to actuation of a switch.

84. The system of claim 82 further comprising means for providing editing capabilities to the recorded audio signal.

85. The system of claim 84 where the editing capabilities comprise means for deletion of the recorded audio signal.

86. The system of claim 84 where the editing capabilities comprise means for replacement of a portion of the recorded signal.

87. The system of claim 75 further comprising:
means for determining a music tempo for a recorded audio signal;
means for determining a length of the recorded audio signal;
means for altering the recorded audio signal to within a predetermined tempo increment; and
means for providing the altered recorded audio signal to an external device.

88. The method of claim 1, where the identifying the longest recorded track comprises:
accessing an index stored on the storage device;
retriving track information from the index stored on the storage device; and
analyzing the track information to determine the longest recorded track and the corresponding longest track length.

89. The system of claim 38, where the multi-track recorder is further capable of:
accessing an index stored on the storage device;
retriving track information from the index stored on the storage device; and
analyzing the track information to determine the longest recorded track and the corresponding longest track length.

90. The system of claim 75, further comprising:
means for accessing an index stored on the storage device;
means for retriving track information from the index stored on the storage device; and
means for analyzing the track information to determine the longest recorded track and the corresponding longest track length.

91. The method of claim 1, further comprising providing performance mode capabilities comprising:
automatically choosing a next available track from among multiple tracks defined on the storage device, based at least in part on an amount of signal information stored among the multiple tracks;
automatically arming the next available track; and
automatically routing the received input audio signal, the processed audio signal, or both to the next available track.

92. The system of claim 38, where the multi-track recorder is operable to provide performance mode capabilities comprising:
automatically choosing a next available track from among multiple tracks defined on the storage device, based at least in part on an amount of signal information stored among the multiple tracks;
automatically arming the next available track; and
automatically routing the received input audio signal, the processed audio signal, or both to the next available track.

93. The storage media of claim 74, where the memory portion is further programmed to provide performance mode capabilities comprising:
- automatically choosing a next available track from among multiple tracks defined on the storage device, based at least in part on an amount of signal information stored among the multiple tracks;
- automatically arming the next available track; and
- automatically routing the received input audio signal, the processed audio signal, or both to the next available track.

94. The system of claim 75, where the means for initiating recording comprises performance mode capabilities comprising:
- automatically choosing a next available track from among multiple tracks defined on the storage device, based at least in part on an amount of signal information stored among the multiple tracks;
- automatically arming the next available track; and
- automatically routing the received input audio signal, the processed audio signal, or both to the next available track.

95. The method of claim 91, where automatically choosing further comprises:
- establishing a file naming convention that associates filenames stored on the storage device to the multiple tracks.

96. The method of claim 95, where automatically choosing further comprises:
- obtaining information from the filenames relating to which of the multiple tracks an audio signal has been recorded; and
- determining the next available track based on the information.

97. The system of claim 92, where automatically choosing further comprises:
- establishing a file naming convention that associates filenames stored on the storage device to the multiple tacks;
- obtaining information from the filenames relating to which of the multiple tracks an audio signal has been recorded; and
- determining the next available track based on the information.

98. The system of claim 92, where automatically choosing comprises automatically choosing a substantially empty track from among the multiple tracks.

99. The system of claim 94 further comprising means for determining to which of the multiple tracks an audio signal has been recorded.

100. The method of claim 1, further comprising, in response to automatically terminating the recording of the first additional audio track:
- automatically arming a second additional audio track for recording;
- initiating recording of an additional processed audio signal as the second additional audio track on the storage device; and
- automatically arming the first additional audio track for monitoring by a user while the second additional audio track is recorded.

101. The system of claim 38, where the multi-track recorder is further capable of, in response to automatically terminating the recording of the first additional audio track:
- automatically arming a second additional audio track for recording;
- initiating recording of an additional processed audio signal as the second additional audio track on the storage device; and
- automatically arming the first additional audio track for monitoring by a user while the second audio track is recorded.

102. The system of claim 75, further comprising, in response to automatically terminating the recording of the first additional audio track:
- means for automatically arming a second additional audio track for recording;
- means for initiating recording of an additional processed audio signal as the second additional audio track on the storage device; and
- means for automatically arming the first additional audio track for monitoring by a user while the second audio track is recorded.

* * * * *